(12) United States Patent
Borchers

(10) Patent No.: US 10,765,067 B2
(45) Date of Patent: Sep. 8, 2020

(54) WRAPPING APPARATUS AND METHOD WITH A SECURITY MECHANISM AND A DRIVE BLOCKING MECHANISM

(71) Applicant: Forage Company B.V., Maassluis (NL)

(72) Inventor: Jürgen Borchers, Wolfenbüttel (DE)

(73) Assignee: Forage Company BV, Maassluis (NL)

( * ) Notice: Subject to any disclaimer, the term of this patent is extended or adjusted under 35 U.S.C. 154(b) by 213 days.

(21) Appl. No.: 15/973,683

(22) Filed: May 8, 2018

(65) Prior Publication Data

US 2018/0325033 A1 Nov. 15, 2018

(30) Foreign Application Priority Data

May 15, 2017 (NL) .................................... 2018918

(51) Int. Cl.
| | | |
|---|---|---|
| *A01F 15/07* | (2006.01) | |
| *B65B 11/02* | (2006.01) | |
| *B65B 57/00* | (2006.01) | |
| *A01F 21/00* | (2006.01) | |

(52) U.S. Cl.
CPC ............ *A01F 15/071* (2013.01); *A01F 21/00* (2013.01); *B65B 11/025* (2013.01); *B65B 57/005* (2013.01); *A01F 2015/076* (2013.01)

(58) Field of Classification Search
CPC .. A01F 15/071; A01F 21/00; A01F 2015/076; B65B 11/025; B65B 57/005
See application file for complete search history.

(56) References Cited

U.S. PATENT DOCUMENTS

| | | | | |
|---|---|---|---|---|
| 3,228,179 A | * | 1/1966 | Van Der Lely | ...... A01D 78/148 56/377 |
| 4,228,638 A | * | 10/1980 | Rabe | ................... A01F 15/0816 100/74 |
| 5,822,957 A | * | 10/1998 | Esch | ...................... A01F 15/071 53/529 |
| 5,941,169 A | * | 8/1999 | Brown | ................ A01F 15/0875 100/188 BT |
| 6,722,110 B1 | * | 4/2004 | Royneberg | ............ A01F 15/071 100/15 |
| 2003/0089081 A1 | * | 5/2003 | Platon | ................... A01F 15/071 53/399 |

(Continued)

FOREIGN PATENT DOCUMENTS

| | | |
|---|---|---|
| DE | 10 2014 016498 A1 | 5/2016 |
| EP | 2 106 688 A1 | 10/2009 |

(Continued)

OTHER PUBLICATIONS

European Patent Office, International Search Report for Priority Application No. NL2018918, search report dated Jan. 18, 2018.

*Primary Examiner* — Nathaniel C Chukwurah
*Assistant Examiner* — Lucas E. A. Palmer

(57) ABSTRACT

An apparatus and method for wrapping an object. The object is on an object support. A wrapping unit drive rotates a wrapping unit part with a holder for wrapping material around the object. A barrier in a protecting position provides a mechanical safety mechanism. When the barrier is moved into a further position, an interrupter is moved into an interrupting position and interrupts a supply connection for the wrapping unit drive. Thereby the wrapping unit part is no longer rotated.

11 Claims, 15 Drawing Sheets

(56) References Cited

U.S. PATENT DOCUMENTS

| | | | | |
|---|---|---|---|---|
| 2003/0101697 | A1* | 6/2003 | Martensen | A01F 15/071 53/588 |
| 2005/0045051 | A1* | 3/2005 | Viaud | A01F 15/07 100/88 |
| 2009/0249746 | A1* | 10/2009 | Viaud | A01F 15/071 53/399 |
| 2012/0012012 | A1* | 1/2012 | Bruning | A01F 15/08 100/8 |
| 2012/0060444 | A1* | 3/2012 | Reijersen Van Buuren | A01F 15/071 53/203 |
| 2015/0338021 | A1* | 11/2015 | Beaudoin | A01F 21/00 100/349 |
| 2016/0120128 | A1* | 5/2016 | Guerin | B65B 11/025 53/588 |
| 2017/0188518 | A1* | 7/2017 | de Bruijn | A01D 87/122 |

FOREIGN PATENT DOCUMENTS

| | | |
|---|---|---|
| EP | 3 228 179 A1 | 10/2017 |
| GB | 2 495 903 A | 5/2013 |

* cited by examiner

WRAPPING APPARATUS AND METHOD WITH A SECURITY MECHANISM AND A DRIVE BLOCKING MECHANISM

BACKGROUND OF THE INVENTION

Field of the Invention

The invention refers to an apparatus and a method for wrapping an object, in particular a bale made from agricultural crop material, whereby a mechanical security mechanism for the wrapping unit is provided.

Description of Related Art

The wrapping apparatus according to the invention can belong to a baler-wrapper combination. A baler-wrapper combination as known for agricultural purposes comprises a bale forming apparatus (baler) and a wrapping apparatus and operates as follows: It is moved over an agricultural field, receives crop material from the field, forms under pressure from the received crop material a bale in a pressing chamber provided by the baler, ejects the formed bale out of the pressing chamber onto the wrapping table of the wrapping apparatus, wraps the bale on the wrapping table into impermeable plastic sheet, and deposits the entirely wrapped bale on the ground.

Rotated parts of the wrapping apparatus operate outside of the pressing chamber. It is requested to protect a human operator from being injured by such a rotating part of the wrapping apparatus. Therefore a reliable security mechanism is required, e.g. by the standard ISO 4254-14. On the other hand an operator sometimes needs access to the wrapping apparatus and in particular to the wrapping unit which moves the wrapping material around the bale. The security mechanism should enable such an access.

US 2016/0120128 A1 discloses a baler-wrapper combination with a round baler 10 and a bale wrapper 12 positioned behind the baler 10. A bale wrapping frame of the wrapper 12 carries a wrapping table 20 for supporting and rotating an agricultural bale 19 to be wrapped. A bale wrapping unit 24 comprises two rotation arms 26 and a rotational drive 25 which rotates the arms 26 around the vertical axis 28, cf. FIG. 1. For protecting an operator a delimiting rod linkage 34 can be moved into a delimiting or bale wrapping position in which the rod linkage 34 encircles three quarters of the action region 69 of the rotating bale wrapping unit 24, cf. FIG. 2. The rod linkage 34 can be lifted into a transport or bale ejection position in which the linkage 34 no longer encircles the action region 69. In this situation a control device deactivates a rotational operation of the bale wrapper 12, cf. par. [0025].

FIG. 3 of GB 2188587 A discloses a bale wrapper 10 which can be coupled with a tractor. The bale 12 to be wrapped is kept in a protecting casing comprising a rear frame part 14 and a U-shaped frame part 30. A rear door 36 is mounted at the frame par 30. Hydraulic arms 40 can open the door 36. A beam 46 carries a shaft 55 which carries a horizontal arm 48. Two vertical arms 58 are mounted at the horizontal arm 48 and carry two holders 60 for two plastic films 61. A hydraulic motor 50 rotates the shaft 55 with the arms 48 and 58. Thereby the bale 12 is wrapped. A wire mesh guard 34 protects the operator.

SUMMARY OF THE INVENTION

The wrapping apparatus according to the invention comprises
an object support for supporting from below an object to be wrapped,
a wrapping unit with a rotatable part comprising at least one holder for a wrapping material reservoir,
a wrapping unit drive for rotating the wrapping unit,
at least one mechanical barrier, and
a mechanical blocking mechanism.
The or at least one barrier is movable with respect to the wrapping unit between
a protecting position and
at least one further position.
The or every movable barrier being in the or the respective protecting position provides a mechanical safety mechanism.
The blocking mechanism comprises
at least one mechanical interrupter and
at least one interrupter connector.
The or every mechanical interrupter is movable between
an interrupting position and
at least one further position.
The or one interrupter being in the interrupting position interrupts a supply connection for the wrapping unit drive, thereby deactivating the wrapping unit drive. The or every interrupter being in the or one further position does not engage the supply connection, thereby enabling the wrapping unit drive to rotate the wrapping unit part.
The or one interrupter connector mechanically connects the or one movable barrier with the or one movable mechanical interrupter. In the case of several movable barriers every movable barrier is connected with the or at least one interrupter by means of the or one interrupter connector.
The or every interrupter connector couples
a movement of the or one barrier into the or one further position with
a movement of the or one interrupter into the interrupting position.
The wrapping apparatus according to the invention operates as follows and the wrapping method according to the invention comprises the following steps:
The object to be wrapped is placed on the object support such that the object is supported from below by the object support.
The wrapping unit drive rotates the rotatable part of the wrapping unit around the object support and thereby around the object on the object support. Thereby the object on the object support is wrapped into at least one web of wrapping material. This web is taken from the or one wrapping material reservoir. This reservoir is kept by the or at least one holder belonging to the rotated wrapping unit part. This holder with a wrapping material reservoir is moved around the object.
While the wrapping unit part is rotated and in particular while the object is wrapped, every movable mechanical interrupter is in the or one further position and does not engage the supply connection. The or every moveable barrier is in the protecting position while the wrapping unit is rotated such that the or every barrier provides a mechanical security mechanism.
The wrapping apparatus is further arranged to operate as follows and the method comprises a sequence which is performed at least once wherein the sequence comprises the following further steps:

At least one barrier is moved from the protecting position into the or one further position.

The or one interrupter connector transfers the movement of the barrier into the further position onto the or one interrupter connected with the moved barrier. Thereby the connected interrupter is moved into the interrupting position.

The interrupter being in the interrupting position automatically interrupts the supply connection for the wrapping unit drive, thereby deactivating the wrapping unit drive. The wrapping unit drive does no longer rotate the rotatable wrapping unit part.

Advantages

As long as the or every movable barrier is in the protecting position, a mechanical safety mechanism is provided. This safety mechanism protects a human operator or a further living being outside of the wrapping apparatus from engaging into the working area of the rotated wrapping unit part. Thereby the safety mechanism helps to fulfill a safety requirement according to ISO 4254-14. As the safety mechanism is a mechanical device, it also protects the operator when the operator or further living being does not pay attention to the environment and does not notice the wrapping unit or an alert or willingly ignore such an alert. This is an advantage of a mechanical barrier over a device for generating visual or acoustic signals. The invention can be combined with such an alert generator but does not require it.

If the wrapping apparatus belongs to a vehicle which is moved over ground, the or every barrier being in the protecting position reduces the risk that the rotated wrapping unit part on board of the moved vehicle hits a living being or an obstacle. If at all, the or one barrier in the protecting position hits the obstacle.

From time to time it is necessary that an operator obtains access to the wrapping unit, e.g. for placing a new wrapping material reservoir into the or one holder of the rotatable wrapping unit part or to perform maintenance or a repair action. For doing so it is necessary to move the or one barrier out of the protecting position. According to the invention the or at least one barrier is movable with respect to the wrapping unit. Therefore it is not necessary to remove the or every barrier from the wrapping apparatus for obtaining access to the wrapping unit. It suffices that the or one barrier is moved into the or one further position. The barrier remains connected with the wrapping apparatus. This feature saves time compared with removing the barrier and later mounting it again.

Thanks to the invention the rotation of the wrapping unit part with the holder is automatically stopped when at least one barrier is moved out of the protecting position—more precisely: The wrapping unit drive is automatically deactivated by the interrupter.

The blocking mechanism according to the invention automatically deactivates the wrapping unit drive when the or one barrier is moved into the or one further position. It is not necessary that an operator switches off the wrapping unit drive. Therefore the security mechanism does not depend on the attention of the operator. The wrapping unit drive is also deactivated when the or one barrier is unintentionally or by an animal or an obstacle moved into the or one further position.

According to the invention the or one mechanical interrupter interrupts the supply connection for the wrapping unit drive when being moved into the interrupting position. The interrupter is moved in the interrupting position by the movement of the or one barrier into the or one further position. The barrier movement is mechanically transferred onto the interrupter by the interrupter connector. The invention ensures an immediate reaction on the step that the or one barrier is moved into the or one further position. This reaction does not depend on the operation of an actuator for the interrupter or for the wrapping unit drive which may fail. In the case of several barriers the wrapping unit drive is deactivated if only one barrier is moved into the or one further position. In the case of several interrupters one interrupter being in the interrupting position suffices to interrupt the wrapping unit drive.

Thanks to the invention no position sensor which monitors the position of the or one barrier is required. Such a sensor can malfunction, e.g. due to dirt, debris or an electric or electronic failure, and can in particular not generate a required alert or generate a false alarm. In addition an operator or further living being may not pay attention to an alert generated on the basis of sensor signals. The invention can also be implemented without or with such a position sensor. It is further possible but not necessary to provide a sensor which monitors whether or not the wrapping unit drive rotates the wrapping unit. Thanks to the invention it is also not necessary to provide an optical sensor which monitors the working area of the rotated wrapping unit part. Such an optical sensor may become polluted.

The wrapping unit drive is automatically deactivated by the or one interrupter. No action of a control unit is required. Therefore no data connection between the control unit and the wrapping unit drive needs to be established when the barrier is moved into the or one further position. The protecting function is also achieved when no control unit is provided or the control unit malfunctions or a data connection is interrupted.

The invention can be implemented by using purely passive mechanical parts. In particular no actuator for deactivating the wrapping unit drive and no sensor for monitoring the blocking mechanism, the barrier, or the wrapping unit drive are required.

The invention can quite easily be implemented on board of an existing wrapping apparatus, in particular in the case that the barriers are already mounted. It suffices to add the interrupter and the interrupter connector. Thanks to the invention it is not necessary to adapt the wrapping unit, the wrapping unit drive, a control unit, or an actuator.

PREFERRED EMBODIMENTS

In one embodiment the wrapping unit comprises a wrapping unit carrier. This carrier rotatably carries the rotatable part with the wrapping material holder, i.e. the rotatable wrapping unit part can rotate with respect to the carrier. The wrapping unit drive can rotate the wrapping unit part with the holder with respect to the carrier and with respect to the object support. Preferably the or every barrier is movably connected with the wrapping unit carrier and is not rotated while the wrapping unit drive rotates the part with the holder. This carrier provides a further mechanical stabilization and a further safety mechanism.

In one embodiment the or every barrier in the protecting position has a distance to the ground such that it prevents a standing human from approaching or even contacting the rotating wrapping unit part. Preferably the or every barrier can be pivoted downwards, i.e. towards the ground, into a further position wherein the barrier is angularly below the wrapping unit when the barrier is in this further position.

Thereby the barrier in the further position does not contact the wrapping unit and is not an obstacle to an operator accessing the wrapping unit. The barrier in the further position does not increase the height over ground of the wrapping apparatus. It is also possible, however, that the or one barrier can be pivoted upwards into the or one further position. The pivoting axis of the barrier can be horizontal or vertical or angularly sloping. It is further possible that the or one barrier can linearly be moved between at least two different positions, e.g. in a vertical direction.

In one embodiment the wrapping apparatus comprises at least two mechanical barriers. Every barrier is movable between the protecting position and the or at least one further position independently from the or every other barrier. Preferably the barriers are positioned with respect to the wrapping unit such that the barriers selectively prevent or enable access from at least different sides to the wrapping unit. Preferably the object support and the wrapping unit are positioned between at least two movable barriers.

The embodiment with several barriers increases the flexibility without reducing the provided safety as only one selected barrier needs to be moved out of the protecting position for obtaining access whereas all further barriers remain in the protecting position and provide a mechanical safety mechanism. The wrapping unit drive is preferably stopped if only one barrier is moved out of the protecting position.

Preferably every movable barrier is connected with the or one interrupter. Thereby the wrapping unit drive is deactivated if at least one barrier is not in the protecting position—regardless of the respective position of the or every further barrier. This embodiment with several movable barriers provides even increased safety and more flexibility, e.g. for performing maintenance.

In one embodiment the wrapping apparatus comprises a frame. The wrapping unit can be moved with respect to the frame between
a wrapping position and
at least one non-wrapping position.

Preferably the or every barrier is moved together with the wrapping unit.

When being in the wrapping position, the wrapping unit drive can rotate the wrapping unit part such that the object on the object support is wrapped into at least one web. Moving the wrapping unit into the or one non-wrapping position adapts the wrapping apparatus to a further constraint, e.g. enables removing the wrapped object from the object support and depositing it on the ground or enables the wrapping apparatus to be moved over a public street or to be transported in a container or on a truck. Preferably the overall length of the wrapping apparatus is decreased when the wrapping unit is moved into the or one non-wrapping position. In one embodiment the wrapping unit being in the wrapping position extends in a substantially horizontal plane and the rotating axis of the rotatable wrapping unit part is substantially vertical. The wrapping unit is pivoted about a horizontal axis into the non-wrapping position. Preferably the wrapping unit in the non-wrapping position extends in a vertical or angular plane.

When the wrapping unit is in the or one non-wrapping position, it must be inhibited that any wrapping unit part is rotated, i.e. the wrapping unit drive should be deactivated. It is possible that a movement of the wrapping unit into the non-wrapping position directly causes the wrapping unit drive to be deactivated and/or the rotatable wrapping unit part to be locked. One alternative implementation how to prevent the wrapping unit from rotating is to provide at least one barrier connector—that is a mechanical coupling element which couples
a movement of the wrapping unit into the or one non-wrapping position with
a movement of the or at least one barrier into the or one further position.

Moving the wrapping unit into the non-wrapping position has the following effect: The barrier connector moves the or at least one barrier into the or one further position. The enforced movement of the barrier into the further position causes the or one interrupter to be moved into the interrupting position. This embodiment ensures that the wrapping unit drive is automatically and immediately deactivated when the wrapping unit is moved into the or one non-wrapping position.

In one implementation different non-wrapping positions are possible. One non-wrapping position is a depositing position and is taken by the wrapping unit when the object on the object support is entirely and readily wrapped and is to be removed from the object support, e.g. by tilting the object support, and is deposited, e.g. on the ground. The wrapping unit can further be moved from the depositing position into a transport position, e.g. when the wrapping apparatus is to be shipped or otherwise transported without wrapping an object. It is possible that the barrier connector forces the barrier into the further position if the wrapping unit is pivoted into one non-wrapping position, i.e. also into the depositing position. It is also possible that only a movement onto the transport position causes the barrier to be moved into the further position. When the wrapping unit is in the depositing position, the or every barrier further provides the mechanical security.

Preferably the or every barrier connector is hingedly connected with the or one movable barrier and with the frame of the wrapping apparatus. Preferably the or every barrier is hingedly connected with the wrapping unit. Thanks to this connection the or every barrier is moved together with the wrapping unit when the wrapping unit is moved with respect to the frame into the or one non-wrapping position. The barrier connector forces the or every barrier to be moved with respect to the wrapping unit into the or one further position. The or every interrupter is moved into the interrupting position. This embodiment ensures that the wrapping unit drive is automatically deactivated by using only passive mechanical parts. In particular the wrapping unit drive is deactivated without a control input from a control device and without the need for a human input from an operator.

In one embodiment the or every barrier can pivot with respect to the wrapping unit about a barrier pivoting axis. The or one interrupter connector can pivot with respect to this barrier about a connector pivoting axis. A lever arm emerges between these two pivoting axes. When the barrier is pivoted into the or one further position, the connected interrupter connector is moved by this lever arm and moves the interrupter into the interrupting position.

The wrapping unit drive can comprise a mechanical motor. In one implementation the wrapping apparatus further comprises a drive connection which connects the wrapping unit drive with a main input shaft of the wrapping apparatus. A further shaft, e.g. the PTO shaft of a tractor, rotates the main input shaft and thereby moves the wrapping unit drive. For stopping the wrapping unit part or the wrapping unit drive it is not necessary to interrupt the drive connection or even the main input shaft.

The wrapping unit drive can also be implemented as a hydraulic, pneumatic, or electric motor. A source for hydraulic or pneumatic fluid or electric energy can be mounted on board of the wrapping apparatus itself or outside of the wrapping apparatus.

The rotatable wrapping unit part can comprise a ring ("wrapping ring") or further rotatable part which encircles the object on the object support and carries the or every holder for a wrapping material reservoir. The rotatable part can also comprise a shaft and at least one arm ("wrapping arm"), preferably one arm per holder, which is mounted at the shaft. The shaft is positioned above the object on the object support. The or every arm is rotated around the object support. The or every holder is preferably mounted at the lower end of the or one arm.

In one embodiment the object on the object support remains in its position with respect to the object support. In a further embodiment the object support rotates the object around an object rotating axis. This object rotating axis is preferably perpendicular to the wrapping unit rotating axis, i.e. that axis around which the wrapping unit drive rotates the wrapping unit part with the holder. The further embodiment ensures that the entire surface of the object on the object support is wrapped.

The wrapping apparatus can belong to a vehicle, e.g. to an agricultural vehicle which is moved over a field. The wrapping apparatus can be a stand-alone wrapper or can belong to an object forming and wrapping combination, e.g. to an agricultural baler-wrapper combination. The wrapping apparatus can also belong to a stationary plant.

These and other aspects of the invention and of the preferred embodiment will be even more apparent from the detailed embodiment as described below and will be elucidated in detail there.

DETAILED DESCRIPTION OF EMBODIMENT

Figure 1:
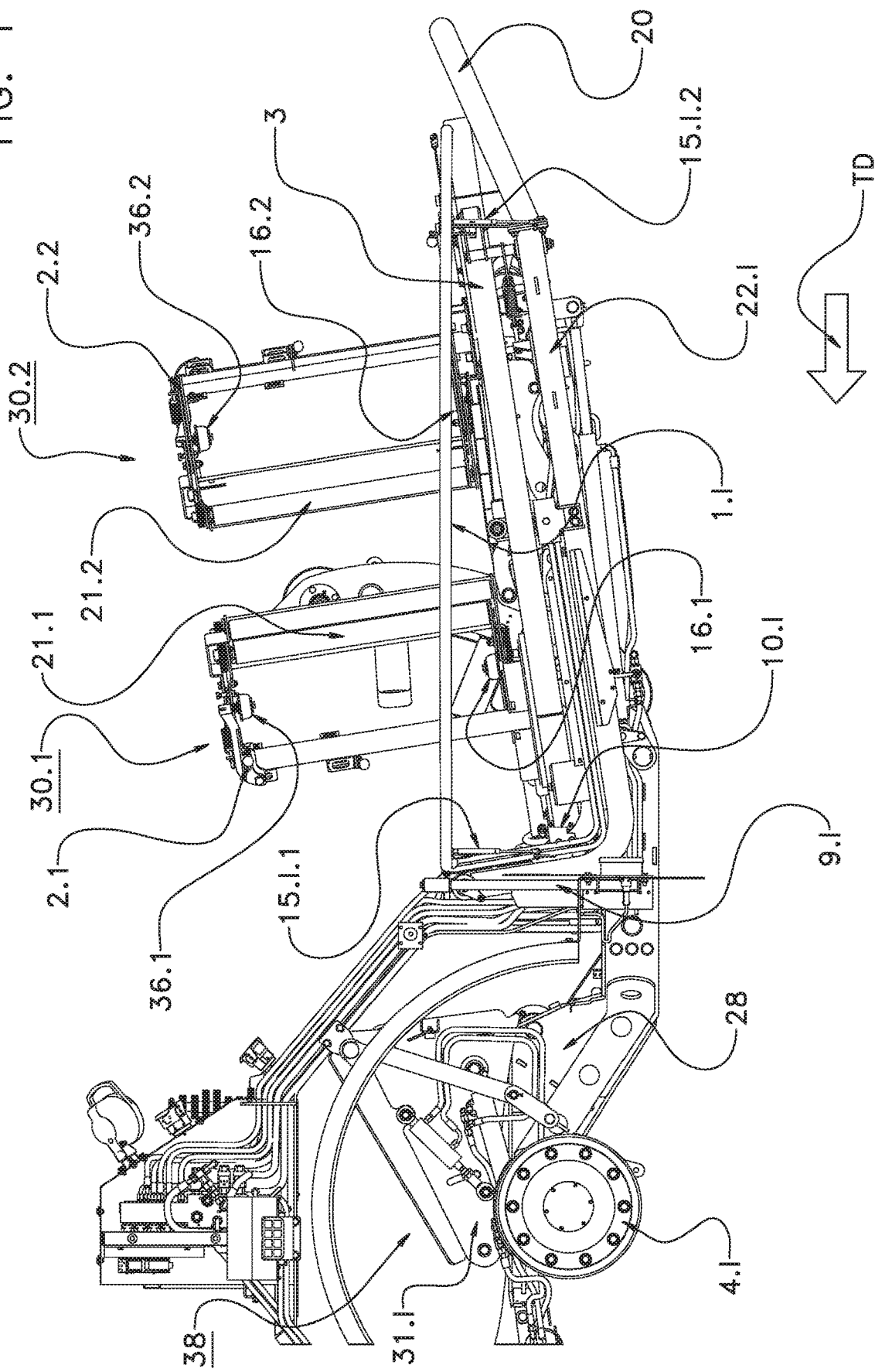
FIG. 1 shows from the left-hand side the wrapping apparatus of the embodiment with the wrapping unit in a slightly inclined wrapping position and both barriers in the protecting position.
Figure 2:
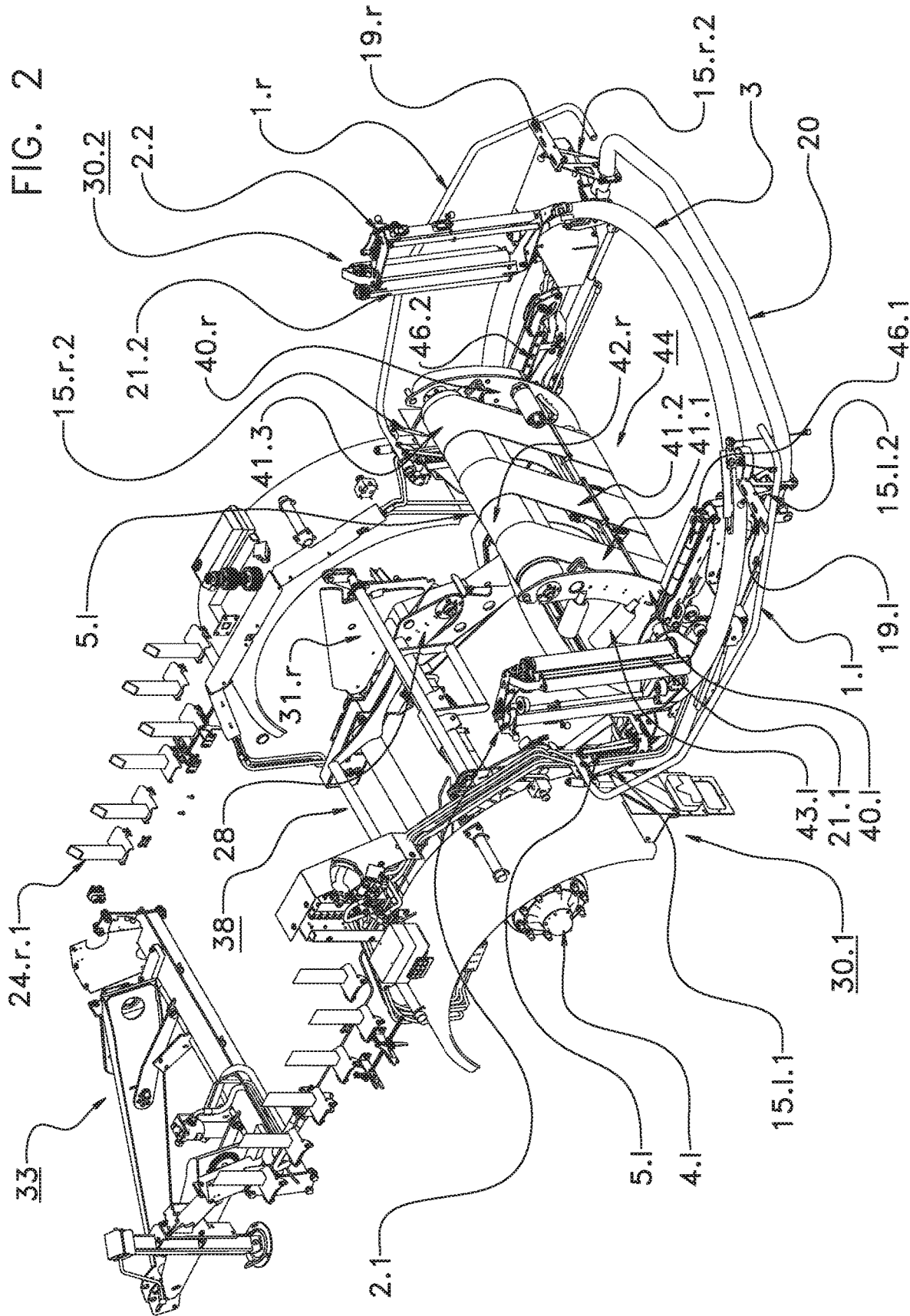
FIG. 2 shows in a perspective view the wrapping apparatus with both barriers and the wrapping unit in the positions of FIG. 1.
Figure 3:
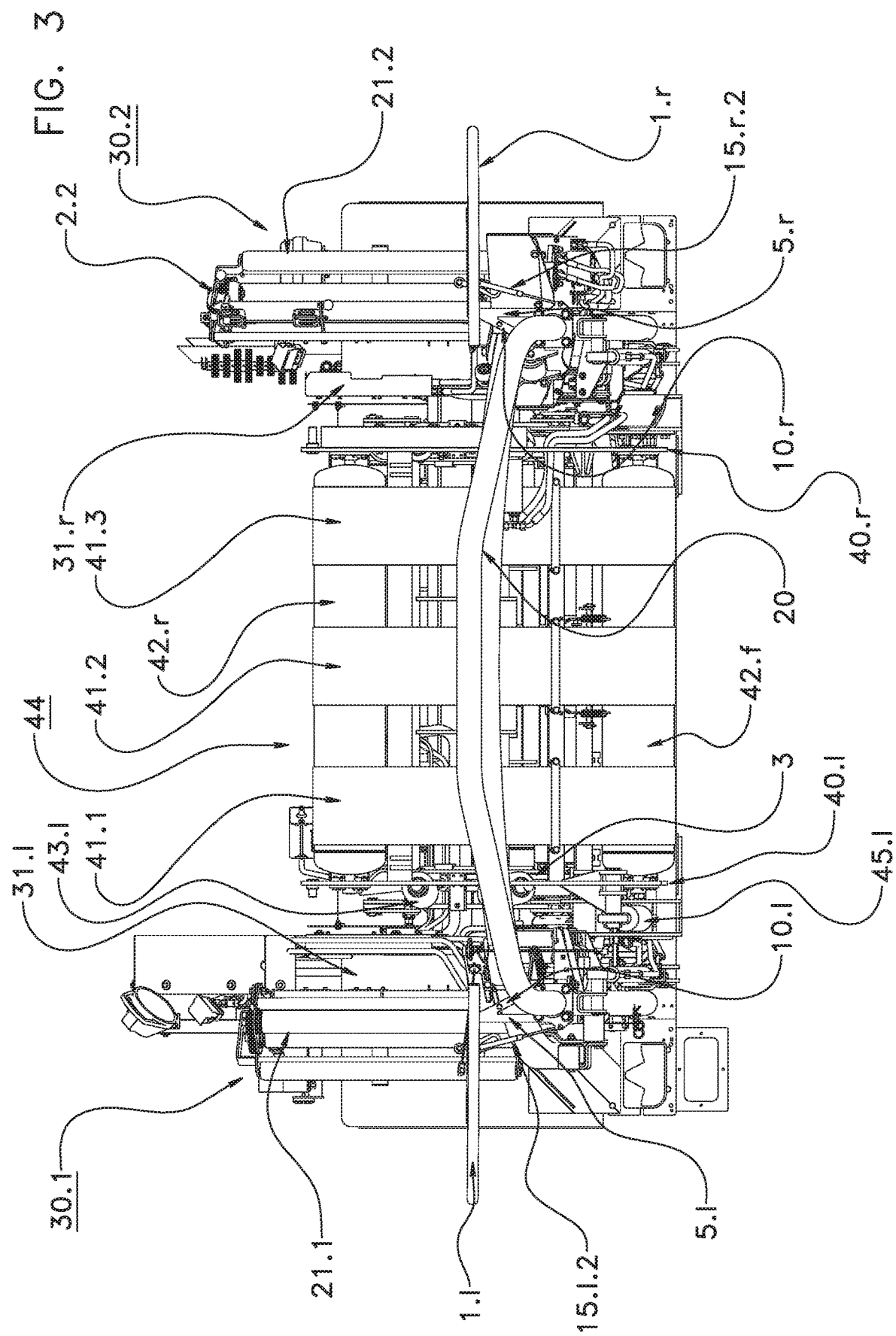
FIG. 3 shows in a rear view the wrapping apparatus with both barriers and the wrapping unit in the positions of FIG. 1.
Figure 4:
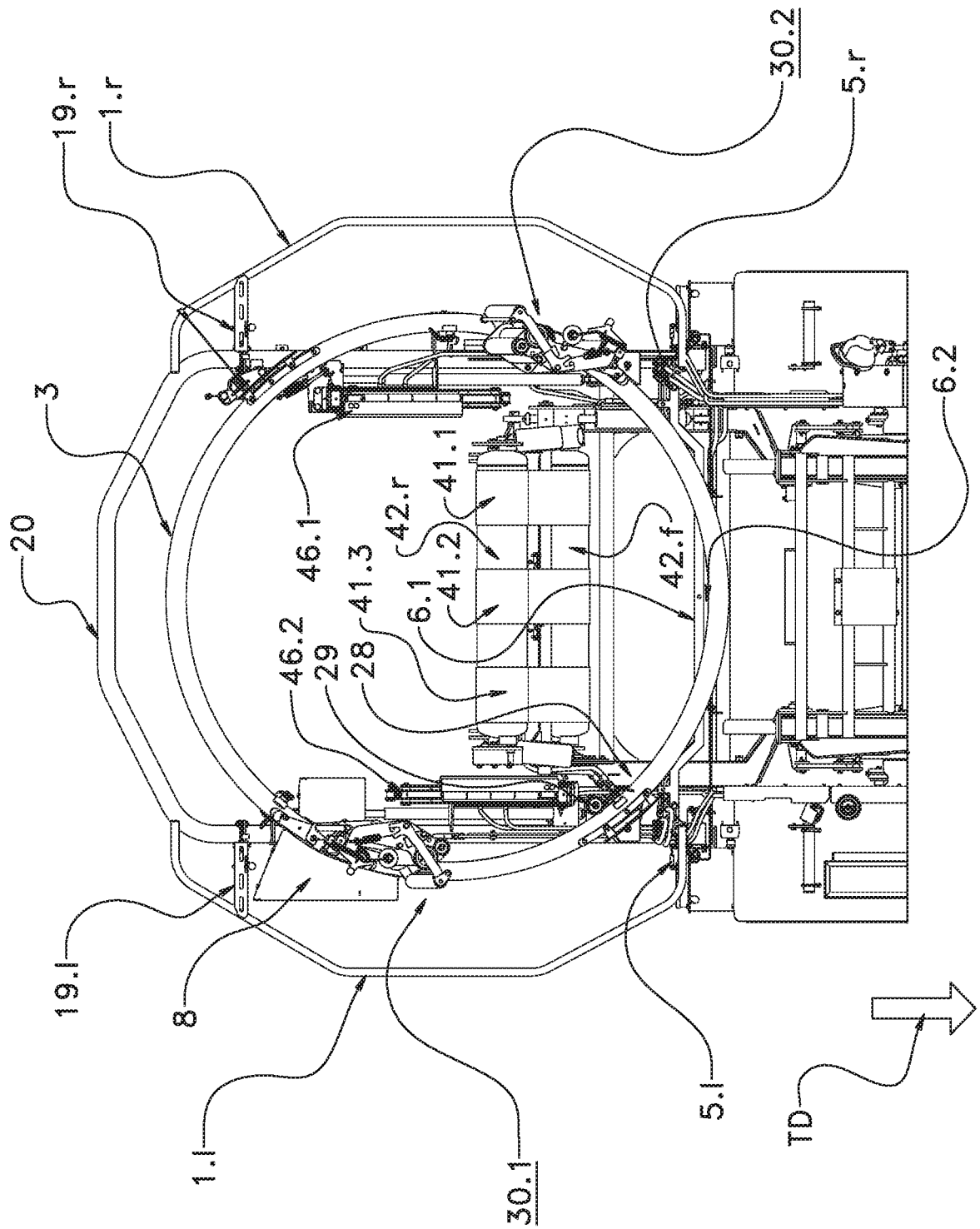
FIG. 4 shows in a top view the wrapping apparatus with both barriers and the wrapping unit in the positions of FIG. 1.

In the embodiment the invention is used on board of a baler-wrapper combination for agricultural purposes. A propelled vehicle (not shown), e.g. a tractor, moves the combination in a travelling direction TD over a field. The baler-wrapper combination of the embodiment comprises
a combination frame with two ground-engaging wheels,
a round baler,
a wrapping apparatus according to the invention and comprising a pivotal wrapping table serving as the object support and a wrapping unit with a wrapping ring, and
a bale transfer unit positioned between the baler and the wrapping apparatus.

The round baler operates as follows:
A baler pick-up unit picks up loose crop material from the ground.
A conveying rotor conveys the picked-up crop material through a feeding channel in a direction opposite to the travelling direction TD towards a drum-shaped pressing chamber with fixed or variable size.
Optionally a cutting assembly engages into the feeding channel, cooperates with the conveying rotor, and cuts the conveyed crop material.
A bale forming device forms under pressure from injected crop material a round-cylindrical bale in the pressing chamber. This bale forming device comprises several pressing rollers and in one embodiment at least one endless flexible pressing belt surrounding the pressing chamber.
The circumferential surface of the bale in the pressing chamber is wrapped into a web of net or plastic film or into several strands of twine.
A discharge gate (tailgate) is opened and the partially wrapped bale is ejected out of the pressing chamber.

The bale transfer unit comprises a pivotal bale carrier and a hydraulic bale carrier actuator. The partially wrapped and ejected bale drops onto the bale carrier. The bale carrier with the ejected bale is pivoted away from the baler and moves the bale onto the wrapping table while the wrapping table is in a bale receiving position. The bale rolls onto and is kept on the wrapping table such that the bale center axis is perpendicular to the travelling direction TD.

The bale serves as the object to be wrapped. The wrapping apparatus of the embodiment wraps the entire surface of the bale into two webs of impermeable plastic film and operates as follows:
The wrapping table carrying the bale is pivoted around a horizontal axis perpendicular to the travelling direction TD from the bale receiving position away from the baler into a substantially horizontal and slightly inclining bale wrapping position.

Driven belts of the wrapping table rotate the bale on the wrapping table around the bale center axis (perpendicular to the travelling direction TD) while the wrapping table remains in the bale wrapping position.

Two holders for holding two plastic film rolls are moved around the bale on the wrapping table. The common rotating axis around which the holders are rotated is substantially vertical and is perpendicular to the bale center axis around which the bale on the wrapping table is rotated.

As soon as the required numbers of film layers are placed around the bale on the wrapping table, the rotation of the wrapping ring is terminated.

The wrapping ring with the holders is pivoted into a depositing position.

Two clamping and cutting devices clamp the two film webs and sever them.

The wrapping table carrying the entirely wrapped bale is pivoted again away from the baler, this time into a descending bale depositing position. The entirely wrapped bale rolls from the wrapping table through the wrapping ring being in the depositing position and is deposited on the ground.

Optionally a tilting unit (quarter turn) tilts the wrapped bale onto a front face.

In the embodiment several hydraulic and electrical connections are established between the baler-wrapper combination and the pulling vehicle. In one implementation a hydraulic source for every hydraulic motor of the combination is mounted on board of the pulling vehicle. It is also possible that a hydraulic source is mounted on board of the combination. The main input shaft of the combination is mechanically connected with the PTO shaft of the pulling vehicle. The towing unit of the combination is mechanically connected with a corresponding hitch of the propelled vehicle.

The figures only show the wrapping apparatus of the embodiment but neither the round baler nor the propelled vehicle. The wrapping table and the bale to be wrapped as well as the plastic films kept by the holders are omitted in the figures.

In the embodiment shown in the figures the two film holders are mounted on a wrapping ring. While the bale on the wrapping table is wrapped, the wrapping ring is positioned in a horizontal or slightly inclined wrapping position such that the bale is in the interior of the rotated wrapping ring. In one implementation the pivoting angle of the wrapping ring with respect to the wrapping table depends on the diameter of the bale on the wrapping table. Preferably the holders are positioned approximately at the height of the bale center axis.

In an alternative embodiment (not shown) the film holders are mounted at the lower ends of two rotated wrapping arms. The wrapping arms are mounted at a vertical shaft and are positioned above the bale on the wrapping table. In one implementation the height of the wrapping arms over ground or the vertical position of the wrapping arms with respect to the wrapping table is adapted to the bale diameter. After the wrapping table is pivoted into the depositing position, the wrapped bale rolls through a space between the wrapping arms onto the ground.

The combination comprises a combination frame at which a chassis with at least two ground-engaging wheels and a towing unit are mounted. This combination frame carries the bale forming device providing the pressing chamber as well as the bale transfer unit and the wrapping apparatus.

The wrapping apparatus of the embodiment comprises
the pivotal wrapping table,
a power train for moving the rollers and/or belts of the wrapping table wherein the power train is connected with the main input shaft of the combination,
the rotatable wrapping ring with the film holders which together serve as the rotatable wrapping unit part,
a hydraulic wrapping ring motor serving as the wrapping unit drive, and
a wrapping ring carrier carrying the wrapping ring and the clamping and cutting devices.

The wrapping table is pivotally mounted at the combination frame and can be pivoted with respect to the combination frame between
the bale receiving position,
the bale wrapping position, and
the bale depositing position.

The wrapping ring carrier is pivotally mounted at the combination frame such that the wrapping ring carrier together with the wrapping ring can be pivoted with respect to the combination frame and with respect to the wrapping table between
the wrapping position,
the depositing position, and
a transport position.

In the wrapping position the wrapping ring extends in a horizontal or slightly inclined plane. This position can depend on the bale diameter. In the depositing position as well as in the transport position the wrapping ring extends in a substantially vertical or significantly inclining plane. The depositing position may coincide with or differ from the transport position. The combination has a shorter length when the wrapping ring is in the depositing or transport position compared with the wrapping position. The reduced length makes it easier to move the combination over a public street or to place it in a container. The wrapping ring extends always in the same plane than the wrapping ring carrier and can rotate with respect to the wrapping ring carrier but cannot perform a further relative movement. The wrapping ring must not rotate with respect to the wrapping ring carrier when the wrapping ring carrier is in the transport position.

A hydraulic wrapping table actuator can pivot the wrapping table with respect to the combination frame between the three positions. A hydraulic carrier actuator can pivot the wrapping ring carrier together with the wrapping ring with respect to the combination frame between the wrapping position, the depositing position, and the transport position. The hydraulic wrapping ring motor can rotate the wrapping ring with respect to the wrapping ring carrier and thereby with respect to the wrapping table when the wrapping ring carrier is in the wrapping position.

FIG. 1 to FIG. 4 show from different viewing directions the wrapping device of the embodiment with the wrapping ring in the wrapping position and a mechanical safety mechanism comprising two pivotal barriers being in the protecting position. The following parts are shown:
the frame 28 of the combination with a left wheel rim 4.*l* and a right wheel rim 4.*r* for the two ground-engaging wheels (not shown),
a left guiding sheet 31.*l* of the bale transfer unit 38 whereas the right guiding sheet 31.*r* is not shown and the ejected bale can be carried between the two guiding sheets 31.*l*, 31.*r*,
a wrapping table frame with two arcuate frame parts 40.*l*, 40.*r*, a front deflecting roller 40.f and a rear deflecting roller 40.r which are rotatably mounted between the wrapping table frame parts 40.l and 40.r wherein at least one deflecting roller 42.f, 42.r is driven, three belts 41.1, 41.2, 41.3 guided around the deflecting rollers 42.f and 42.r and contacting the bale circumference, two left bobbins 43.l mounted at the left table frame part 40.l, two right bobbins 43.r mounted at the right table frame part 40.r, the two hydraulic piston-cylinder units 45.l, 45.r for pivoting the wrapping table 44, the wrapping ring 3 carrying the two reservoir holders (film roll holders) 30.1, 30.2, the curved wrapping ring carrier 20 which is pivotally mounted at the combination frame 28 and which surrounds and rotatably carries the wrapping ring 3, two clamping and cutting devices 46.1, 46.2 which are mounted on the carrier 20 and which clamp and sever the two plastic films taken from the film rolls in the holders 30.1, 30.2, a guiding roller 29 for the wrapping ring 3 mounted at the wrapping ring carrier 20, a hydraulic motor 8 with a housing mounted at the carrier 20 wherein the motor 8 can rotate the wrapping ring 3 with respect to the wrapping ring carrier 20 and which serves as the wrapping unit drive, two hydraulic lines 6.1, 6.2 which belong to the hydraulic circuit which supplies the hydraulic motor 8 with hydraulic fluid, a left and a right sequences 24.1.1, 24.1.2, . . . and 24.r.1, 24.r.2 . . . of preferably pivotal holders for carrying reserve reservoirs (reserve film rolls) in a vertical orientation, a left barrier 1.l and a right barrier 1.r providing the mechanical safety mechanism, two mounting assemblies for mounting the two carriers 1.l and 1.r at the wrapping ring carrier 20, and a left front gas strut 15.l.1, a left rear gas strut 15.l.2, a right front gas strut 15.r.1, and a right rear gas strut 15.r.2.

The wrapping ring 3, the holders 30.1, 30.2, and the wrapping ring carrier 20 together form the wrapping unit of the embodiment. The wrapping ring 3 and the holders 30.1, 30.2 together form the rotatable wrapping unit part. The wrapping table 44 comprises the table frame parts 40.l, 40.r,
the belts 41.1, 41.2, 41.3,
the deflecting rollers 42.f, 42.r, and
the bobbins 43.l, 43.r.

The hydraulic wrapping ring motor 8 is surrounded by a protective housing which is rigidly mounted at the wrapping ring carrier 20. The hydraulic motor 8 comprises a vertical shaft which is rotated by hydraulic fluid pressed through the lines 6.1 and 6.2. This vertical shaft rotates a sprocket wheel which is made of plastic and which touches the outer vertical surface of the wrapping ring 3. The vertical shaft further rotates via two chain wheels and a chain a further vertical shaft which in turn rotates a further sprocket wheel also made of plastic and touching the inner vertical surface of the wrapping ring 3. The wrapping ring 3 is clamped between the plastic sprocket wheels and is rotated when the plastic sprocket wheels rotate with the same circumferential velocity. The rotating axis of the wrapping ring 3 is substantially vertical to the ground while the wrapping ring carrier 20 is in the wrapping position and a bale is wrapped. The rotating axis of the wrapping ring 3 extends in the drawing plane of FIG. 3 and perpendicular to the drawing plane of FIG. 4.

In addition a spring (not shown) biases two jaws (not shown) against the wrapping ring 3. The biased clamping jaws prevent the wrapping ring 3 from rotating. When the hydraulic motor 8 is activated, it opens the jaws against the biasing force of the spring such that the wrapping ring 3 can rotate. As long as the hydraulic motor 8 is deactivated, the jaws are no longer opened and prevent the clamped wrapping ring 3 from rotating.

Every reservoir holder 30.1, 30.2 is mounted on the wrapping ring 3 and comprises
a holder frame 2.1, 2.2,
a deflecting roller 21.1, 21.2,
an upper reservoir support 36.1, 36.2, and
a lower reservoir support 16.1, 16.2.

A reservoir (film roll) is rotatably kept in a vertical orientation (more precisely: in an orientation parallel to the ring rotating axis) in the holder frame 2.1, 2.2 and rests on the lower support 16.1, 16.2 and is further kept by the upper reservoir support 36.1, 36.2. A web pulled from the film roll is guided around the deflecting roller 16.1, 16.2 which has a vertical rotating axis. A spring tends to rotate the reservoir holder 30.1, 30.2 around a vertical axis such that the plastic film is tensioned.

For wrapping a bale supported and rotated on the wrapping table 44, two plastic films are pulled from the two film rolls held in the holders 30.1, 30.2. The remaining amount of plastic film decreases. Therefore it is necessary from time to time to replace an empty film roll with a new one. In the embodiment this replacement is done by a human operator. In addition repair work on the wrapping unit 3, 20, 30.1, 30.2 might be necessary. For replacing a film roll or for performing maintenance work the operator needs access to the wrapping unit 3, 20, 30.1, 30.2.

On the other hand no human should come too close to the working area of the wrapping unit as long as the wrapping ring 3 rotates. Therefore a mechanical protecting mechanism comprising the barriers 1.l, 1.r is provided. This mechanism fulfills the requirements of ISO 4254-14 and provides safety independently from the operations of a control unit on board of the combination or of the pulling vehicle.

Figure 5:
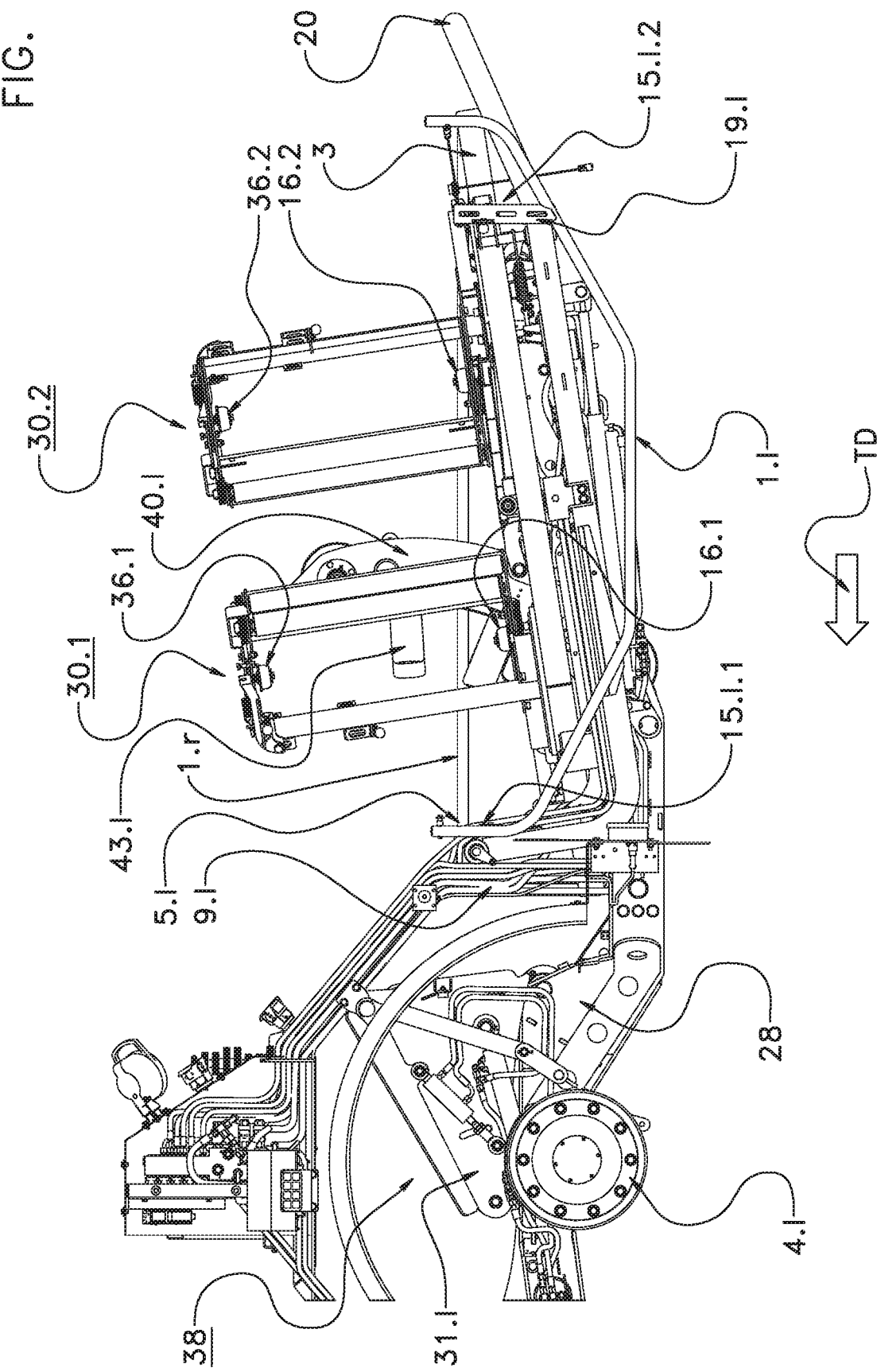
FIG. 5 shows from the left-hand side the wrapping apparatus with the left barrier in the access-enabling position and the right barrier still in the protecting position and the wrapping unit still in the wrapping position.
Figure 6:
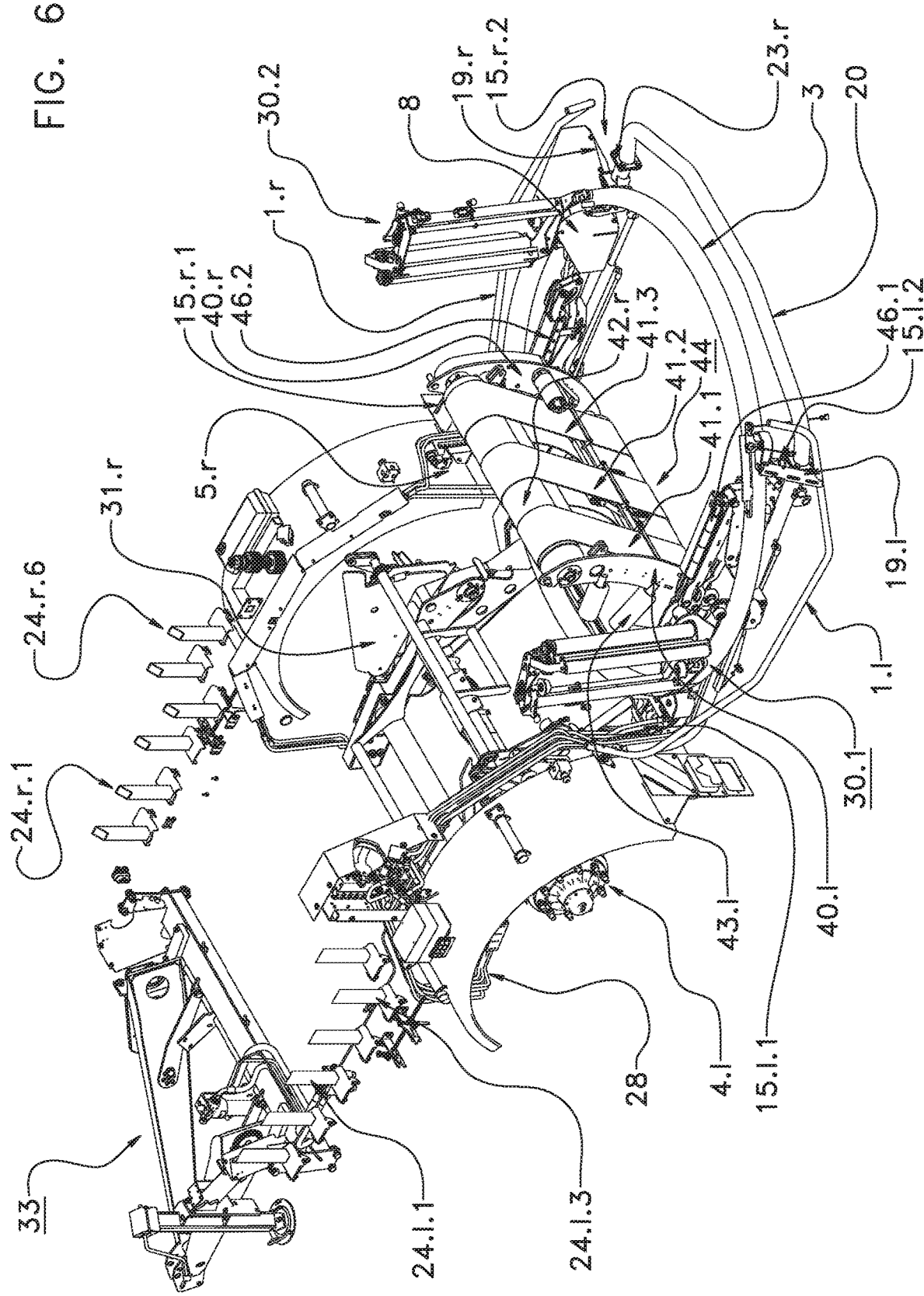
FIG. 6 shows in the perspective view of FIG. 2 the wrapping apparatus with both barriers and the wrapping unit in the positions of FIG. 5.
Figure 7:
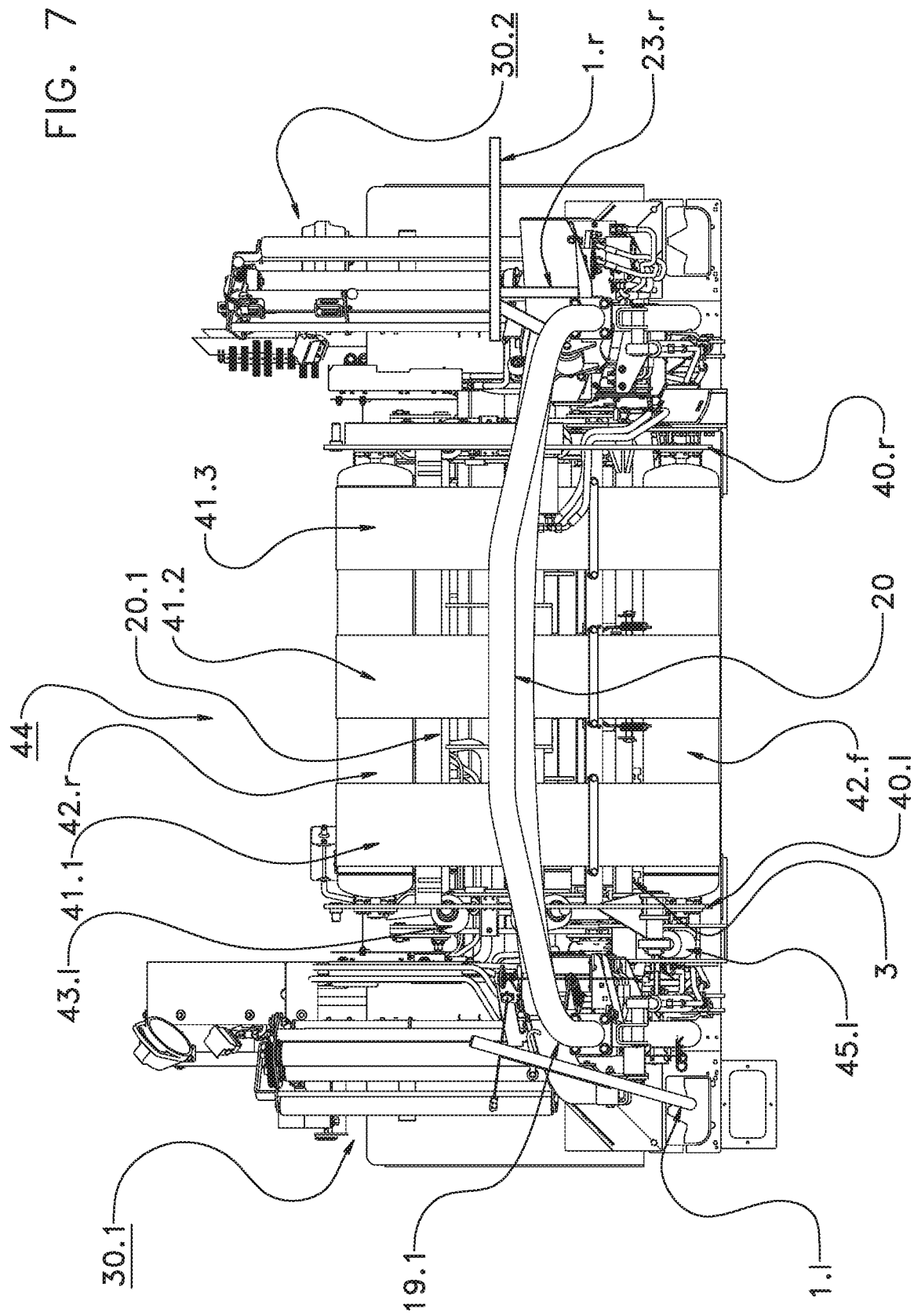
FIG. 7 shows from the rear the wrapping apparatus with both barriers and the wrapping unit in the positions of FIG. 5.

In the embodiment the protecting mechanism comprises two mechanical barriers, namely the left barrier 1.l and the right barrier 1.r wherein the terms "left" and "right" refer to the travelling direction TD of the combination. The wrapping table 44, the wrapping ring 3, the holders 30.1, 30.2, the wrapping ring carrier 20, the clamping and cutting devices 46.1, 46.2, and the bale to be wrapped are positioned between these two barriers 1.l and 1.r. Every barrier 1.l, 1.r has the form of a curved bar which is pivotally mounted at the wrapping ring carrier 20. Every barrier 1.l, 1.r can be pivoted independently from the other barrier 1.r, 1.l between
a protecting position (FIG. 1 to FIG. 4),
a transport position (FIG. 11, FIG. 12), and
an access-enabling position (FIG. 5 to FIG. 7).

When both barriers 1.l, 1.r are in the protecting position, they extend in an approximately horizontal plane such that the combination has the maximal width. Preferably this plane has a height over ground between 2 m and 1.3 m. The barriers 1.l, 1.r provide a mechanical obstacle which prevents a human or other living being from entering into the circular working area of the wrapping ring 3. A blocking mechanism (described below) ensures that the wrapping ring 3 only rotates when both barriers 1.l, 1.r are in the respective protecting position.

Every mounting assembly for a barrier 1./, 1.r comprises (cf. FIG. 12 and FIG. 15)
a stationary triangular carrying element 23./, 23.r which is rigidly mounted at the wrapping ring carrier 20,
a horizontal connecting element 19./, 19.r which is rigidly mounted at the respective barrier 1./, 1.r and hingedly connected with the adjacent stationary carrying element 23./, 23.r, and
a holding element 18./, 18.r (to be described below).

Figure 12:
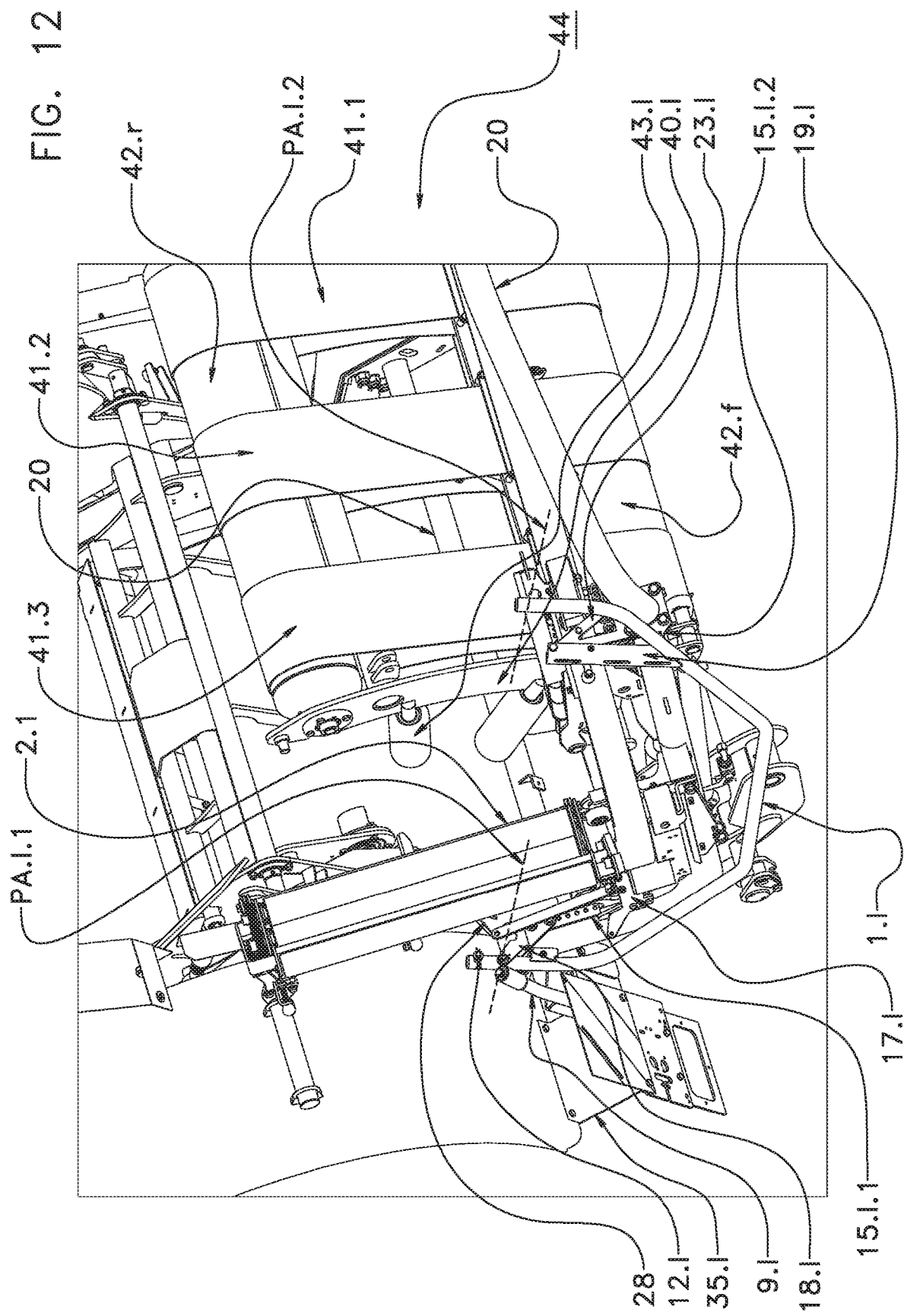
FIG. 12 shows in a detailed view how the left barrier is forced into the transport position.
Figure 13:
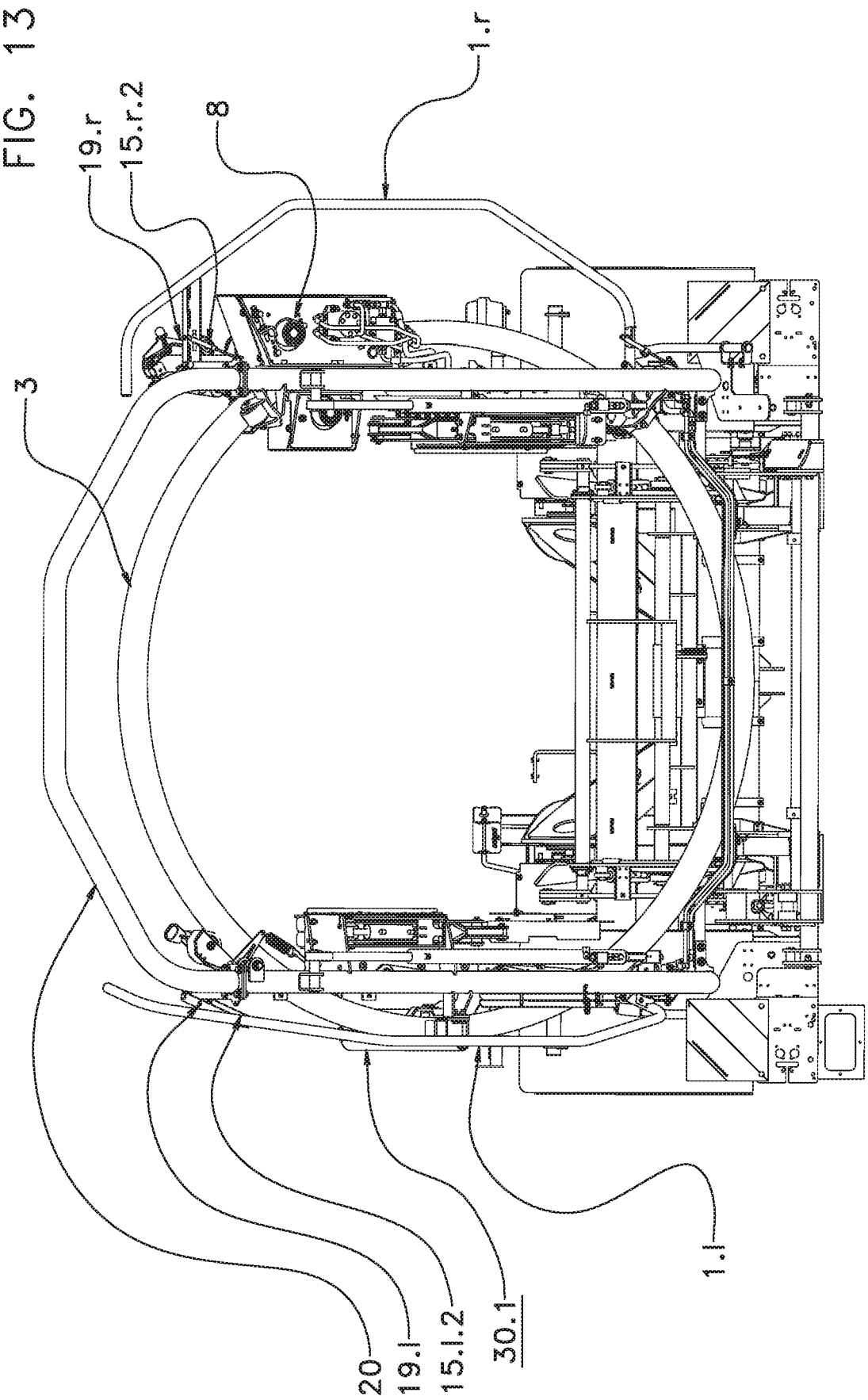
FIG. 13 shows in a top view the wrapping apparatus with the left barrier in the access-enabling position and the right barrier in the protecting position.
Figure 14:
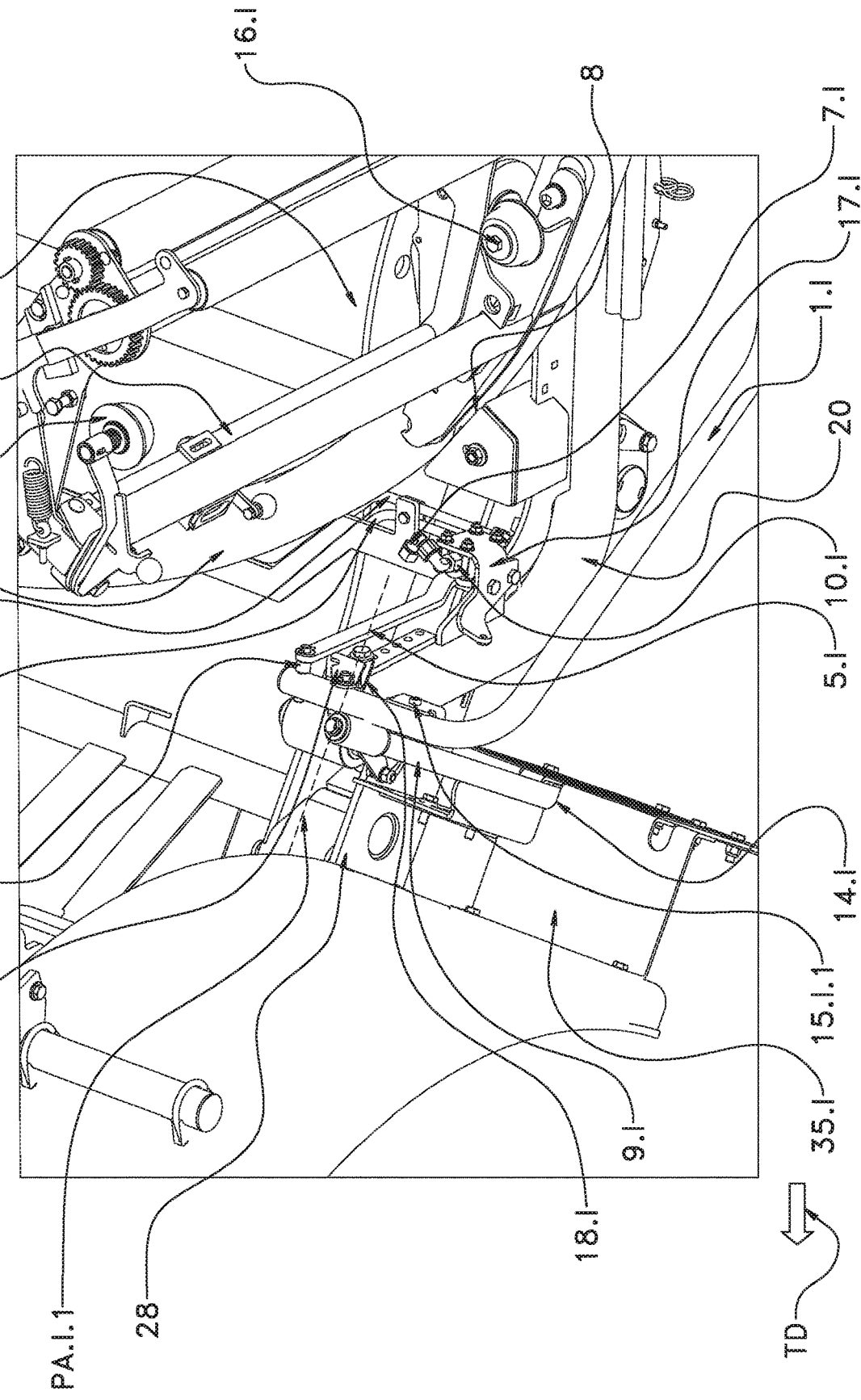
FIG. 14 shows the left transport position rod in a detailed view.
Figure 15:
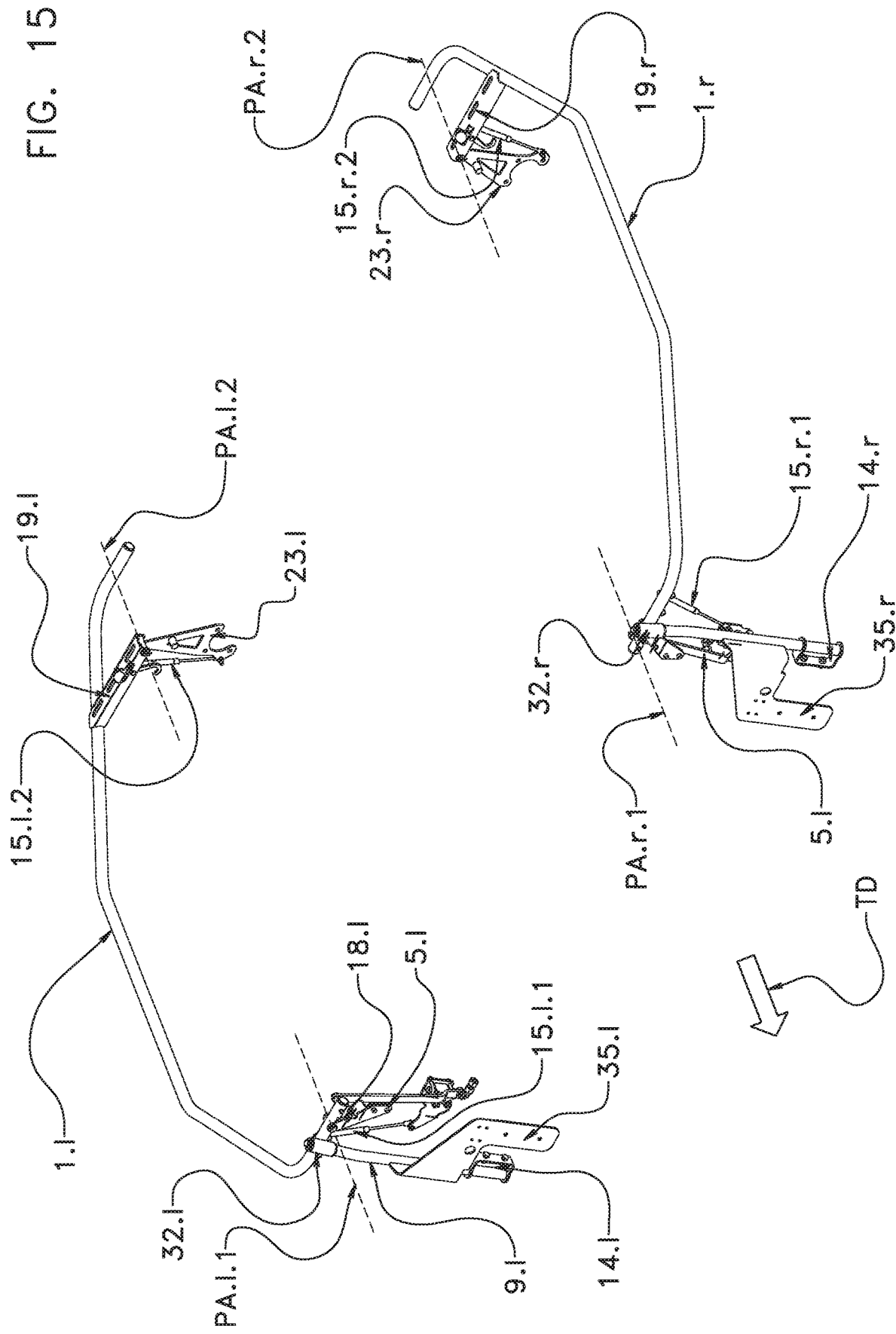
FIG. 15 shows both barriers with their mounting assemblies and both transport position rods.

The barriers 1./, 1.r and the mounting assemblies can best be seen in the perspective view of FIG. 12 and in the detailed view of FIG. 15. The carrying element 23./, 23.r and the connecting element 19./, 19.r keep the barrier 1./, 1.r such that the barrier 1./, 1.r can pivot with respect to the wrapping ring carrier 20 about a rear pivoting axis PA.l.2, PA.r.2. The holding element 18./, 18.r keeps the barrier 1./, 1.r such that the barrier 1./, 1.r can pivot with respect to the wrapping ring carrier 20 about a front pivoting axis PA.l.1, PA.r.1. These pivoting axes PA.l.1 and PA.l.2 as well as PA.r.1 and PA.r.2 are parallel to each other and keep their positions relative to the wrapping ring carrier 20 when the barrier 1./, 1.r is pivoted.

In the embodiment every barrier 1./, 1.r is kept in the protecting position by means of biasing elements in the form of a front gas strut 15./.1, 15.r.1 and a rear gas strut 15./.2, 15.r.2. The lower end of a gas strut 15./.1, 15.r.1, 15./.2, 15.r.2 is pivotally mounted at the wrapping ring carrier 20. The upper end of the front gas strut 15./.1, 15.r.1 is pivotally mounted at the holding element 18./, 18.r of the barrier 1./ or 1.r. The upper end of the rear gas strut 15./.2, 15.r.2 is pivotally mounted at the connecting element 19./, 19.r. For moving the barrier 1./, 1.r out of the protecting position the pistons of the two connected gas struts must be pressed into the corresponding cylinders.

An operator can pivot a barrier 1./, 1.r independently from the other barrier 1.r, 1./ downwards against the biasing force of the connected gas struts 15./.1 and 15./.2 or 15.r.1 and 15.r.2. In the embodiment the barrier 1./, 1.r does not comprise an actuator for pivoting the barriers 1./, 1.r. It would be possible to add such a barrier actuator.

Every barrier 1./, 1.r can be pivoted downwards from the protecting position into the transport position and further into the access-enabling position. The transport position is between the protecting position and the access-enabling position which provide the two possible end positions of the barrier 1./, 1.r. When both barriers 1./ and 1.r are in the transport position, the width of the combination is reduced—compared with at least one barrier 1./, 1.r being in the protecting position. Thanks to the reduced width the combination may be moved over a public street. In the embodiment a movement of the wrapping table into the vertical depositing or transport position is mechanically coupled with a movement of both barriers 1./ and 1.r into the transport position, see below.

When the left barrier 1./ is in the access-enabling position, a human operator has access from the left-hand side of the combination to the wrapping ring 3 and to the wrapping table. When the right barrier 1.r is in the access-enabling position, a human operator has access from right-hand side. It is possible to provide several left barriers in place of one left barrier 1./ and/or several right barriers in place of one right barrier 1.r.

FIG. 5 to FIG. 7 show the wrapping apparatus of the embodiment with the left barrier 1./ in the access-enabling position and the right barrier 1.r still in the protecting position. A mechanical blocking mechanism deactivates the hydraulic motor 8. When the hydraulic motor 8 is deactivated, the spring keeps the two jaws in the clamping position in which they keep the clamped wrapping ring 3 in its current rotational position with respect to the wrapping ring carrier 20 and prevents an undesired wrapping ring movement.

Figure 8:
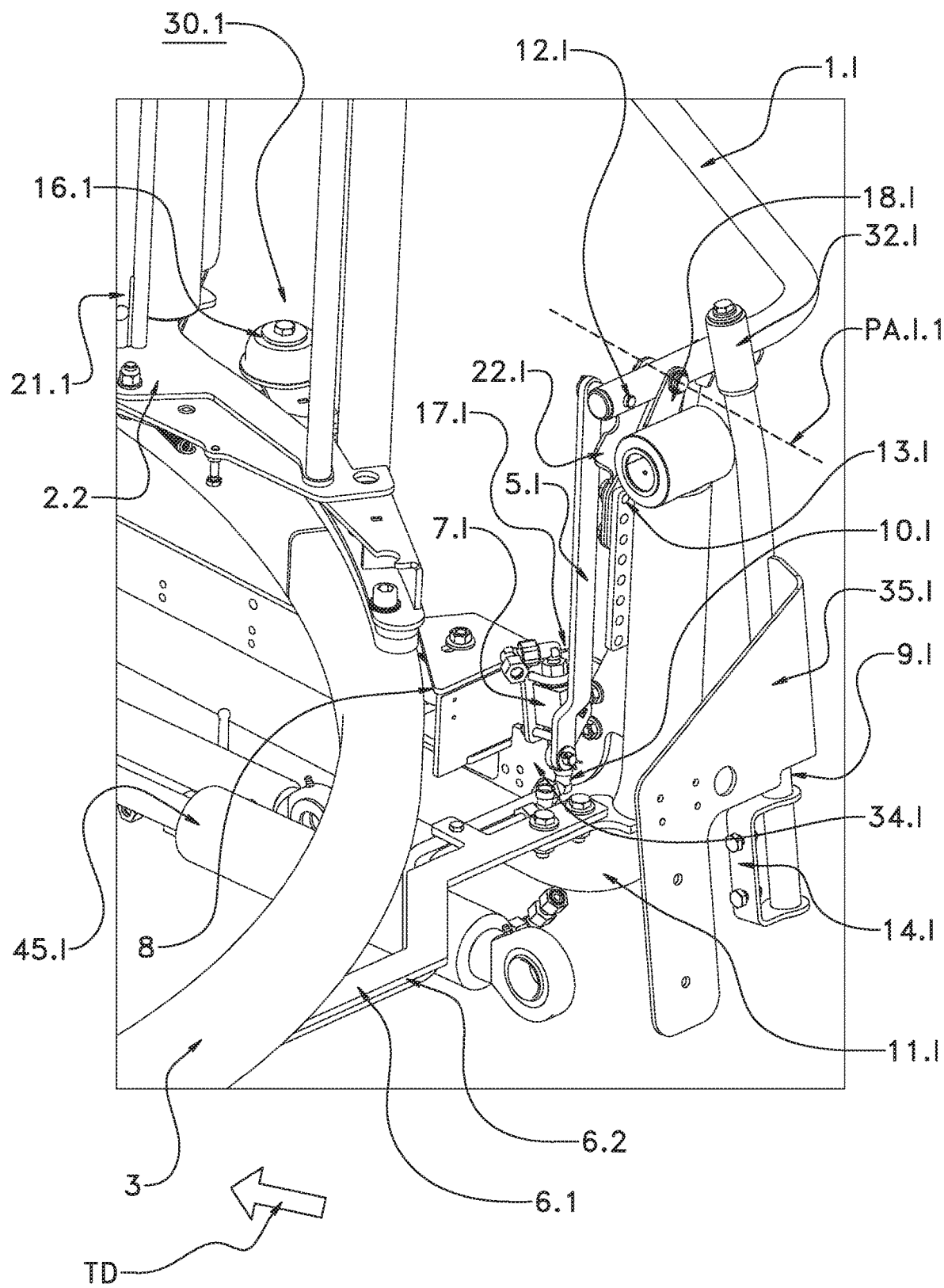
FIG. 8 shows in a detailed view the left interrupter and the left interrupter connector together with segments of the wrapping ring and the wrapping ring carrier.
Figure 9:
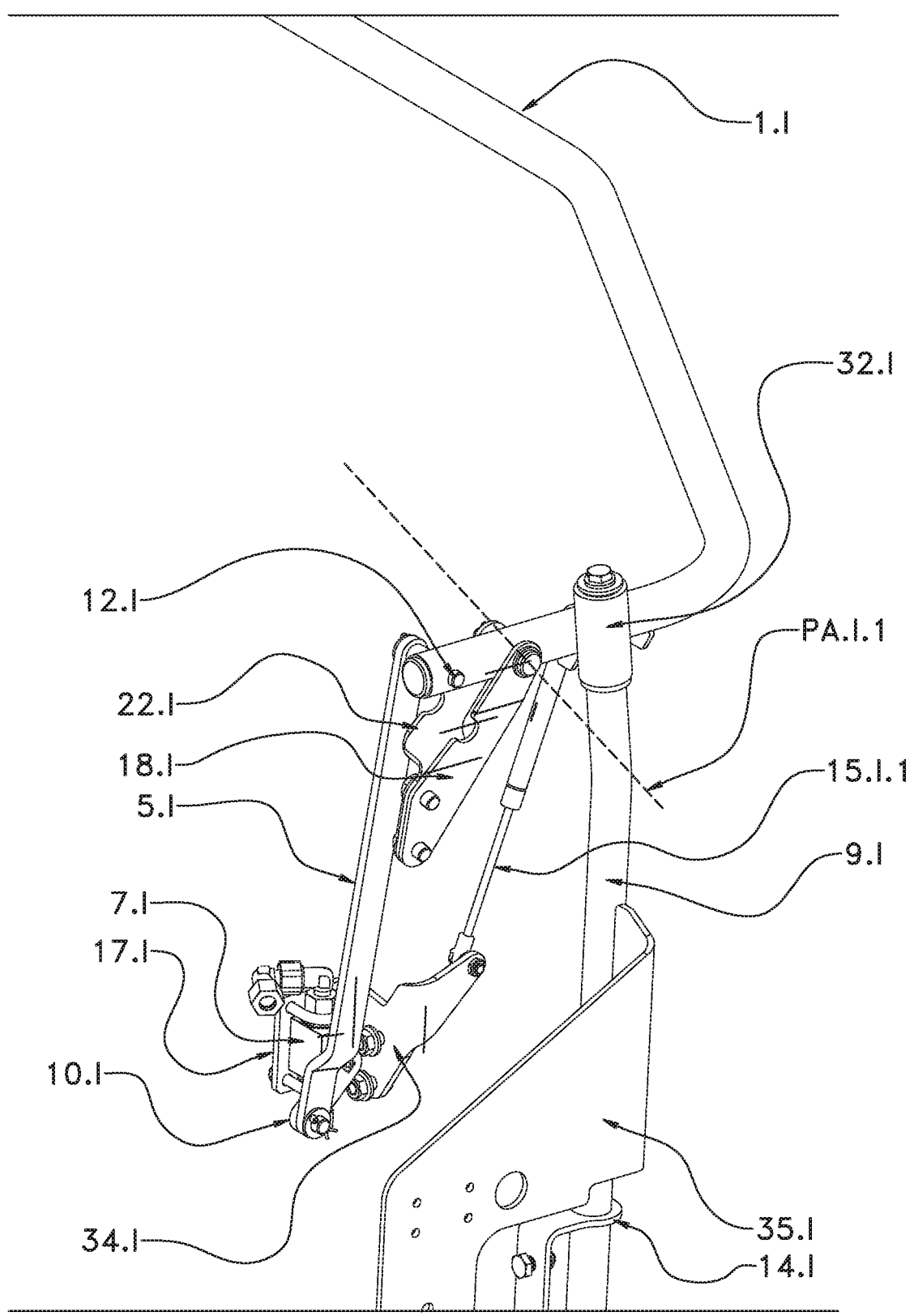
FIG. 9 shows in a more detailed view the left interrupter and the left interrupter connector of FIG. 8.
Figure 10:
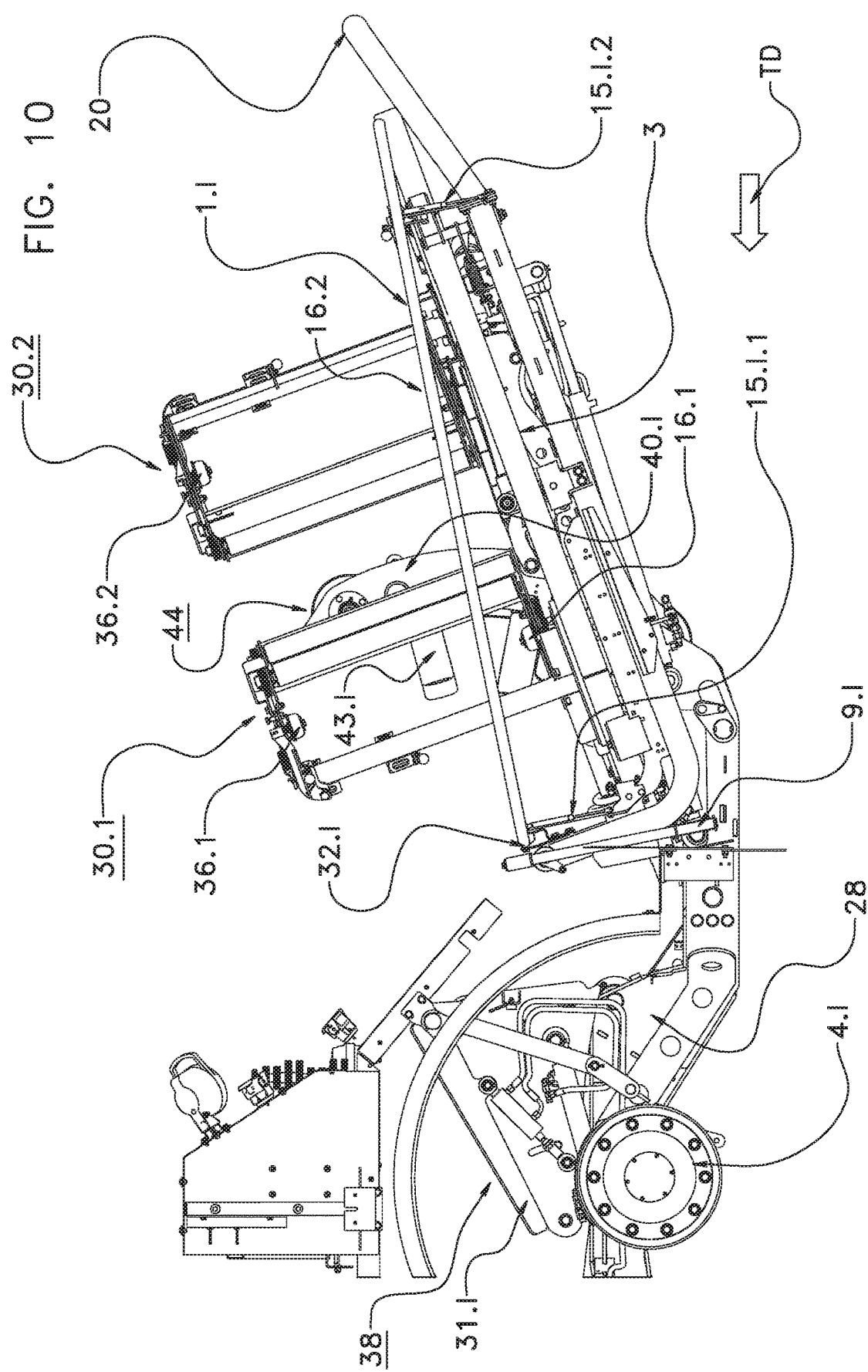
FIG. 10 shows from the left-hand side the wrapping apparatus with the wrapping unit in a further inclined wrapping position and with both barriers in the protecting position.

FIG. 8 and FIG. 9 show in a detailed view the left blocking mechanism of the embodiment which is connected with the left barrier 1./. The viewing direction is angularly rearwards. FIG. 8 shows
the front part of the left barrier 1./ being in the protecting position,
the pivoting axis PA.l.1,
the holding element 18./ of the mounting assembly for the left barrier 1./,
a front part of the wrapping ring 3,
a front part of the wrapping ring carrier 20,
the wrapping ring motor 8,
a part of one reservoir holder 30.1, and
the blocking mechanism for the left barrier 1./.

The holding element 18./ is mounted at a barrier carrier 11./ which is upwardly curved and is rigidly mounted at the wrapping ring carrier 20. A vertical sequence with several holes or threads 13./ is cut into this barrier carrier 11./ and can receive fasteners for fixing the holding element 18./. The holding element 18./ can thereby be mounted at a position selected out of different possible positions. The left barrier 1./ is pivotally mounted at this holding element 18./ such that the left barrier 1./ can pivot around the left front pivoting axis PA.l.1. The holding element 18./ defines this pivoting axis PA.l.1 and prevents a lateral movement of the left barrier 1./. The right barrier 1.r is mounted in a corresponding manner.

Every blocking mechanism comprises
a tap 7./, 7.r,
a tap activating element 17./, 17.r,
a vertically oriented interrupting rod 5./, 5.r, and
a tap connecting element 10./, 10.r, cf. FIG. 9.

The tap 7./, 7.r together with the tap activating element 17./, 17.r serves as the mechanical interrupter of the embodiment and can be moved linearly in a vertical direction between
a releasing position and
an interrupting position.

When in the interrupting position, the tap 7./, 7.r interrupts one hydraulic line 6.1, 6.2 and thereby interrupts the hydraulic circuit for supplying the hydraulic motor 8. The taps 7./, 7.r are mounted at different positions at the lines 6.1, 6.2 and in line such that every tap 7./, 7.r can interrupt the hydraulic line 6.1, 6.2 independently from the position of the other tap 7.r, 7./. One tap 7./, 7.r in the interrupting position suffices to interrupt the hydraulic flow and thereby deactivate the hydraulic motor 8. When in the releasing position, the tap 7./, 7.r does not engage the hydraulic circuit. The tap activating element 17./, 17.r can shift the tap 7./, 7.r vertically between these two positions.

The tap connecting element 10./, 10.r hingedly connects the tap activating element 17./, 17.r for the tap 7./, 7.r with the interrupting rod 5./, 5.r.

The interrupting rod 5./, 5.r and the tap activating element 17./, 17.r together serve as the interrupter connector of the embodiment. The upper end of the interrupting rod 5./, 5.r is hingedly connected with the barrier 1./, 1.r in a pivot 12./, 12.r. Its lower end is hingedly connected with the tap connecting element 10./, 10.r, cf. FIG. 8 and FIG. 9. The pivot 12./, 12.r is guided through a hole near the upper end of the interrupting rod 5./, 5.r and through a hole in a pivot holder 22./, 22.r. This pivot holder 22./, 22.r is movably mounted at the barrier carrier 11.*l*, 11.*r* wherein the holding element 18.*l*, 18.*r* is rigidly mounted. FIG. 9 further shows a left mounting element 34.*l* for the tap 7.*l* which is rigidly mounted at the combination frame 28. The lower end of the gas strut 15.*l*.1 is pivotally mounted at this mounting element 34.*l*.

When the barrier 1.*l*, 1.*r* is pivoted downwards against the biasing force of the gas struts and thereby moved out of the protecting position, the barrier 1.*l*, 1.*r* is pivoted around the front pivoting axis PA.l.1, PA.r.1 as well as around the rear pivoting axis PA.l.2, PA.r.2 which is parallel to the front axis PA.l.1, PA.r.1. The pivot axes PA.l.1, PA.r.1, PA.l.2, and PA.r.2 do not move with respect to the wrapping ring carrier 20. Thereby and as the barrier 1.*l*, 1.*r* is connected with the interrupting rod 5.*l*, 5.*r* in the pivot 12.*l*, 12.*r*, a lever arm emerges between the pivot 12.*l*, 12.*r* and the pivoting axis PA.l.1, PA.r.1 defined by the holding element 18.*l*, 18.*r*. Thanks to this lever arm the interrupting rod 5.*l*, 5.*r* is pulled upwards. The tap connecting element 10.*l*, 10.*r* and the tap activating element 17.*l*, 17.*r* transfer this movement of the interrupting rod 5.*l*, 5.*r* onto the tap 7.*l*, 7.*r*. The tap 7.*l*, 7.*r* is moved upwards out of the releasing position into the interrupting position and interrupts the hydraulic line 6.1, 6.2.

The gas struts 15.*l*.1, 15.*l*.2 and 15.*r*.1, 15.*r*.2 of the embodiment operate in a so-called flip-flop mode. On the one hand they keep the connected barrier 1.*l*, 1.*r* in the protecting position. On the other hand they also keep the barrier 1.*l*, 1.*r* in the access-enabling position after the barrier 1.*l*, 1.*r* is pivoted downwards. Thereby the gas struts 15.*l*.1, 15.*l*.2 and 15.*r*.1, 15.*r*.2 prevent the barrier 1.*l*, 1.*r* from moving back by itself into the protecting position. In particular they prevent a tap 7.*l*, 7.*r* from being unintentionally moved into the releasing position and enabling a hydraulic flow.

As mentioned above a barrier 1.*l* or 1.*r* is pivoted manually by the operator or by an optional actuator (not shown) into the access-enabling position. In general the other barrier 1.*r* or 1.*l* remains in the protecting position. This movement of one barrier 1.*l* or 1.*r* causes the hydraulic motor 8 to be deactivated regardless of the position of the other barrier 1.*r* or 1.*l*. The two jaws keep the wrapping ring 3 in a fixed position with respect to the wrapping ring carrier 20.

When the bale is completely wrapped and is to be deposited, the combination control unit triggers the hydraulic actuator 45.*l*, 45.*r*, to pivot the wrapping table 44 into the bale depositing position and a hydraulic actuator for the wrapping ring carrier 20 to pivot the wrapping ring carrier into the depositing position. In addition the operator can trigger the hydraulic actuator which pivots the wrapping ring carrier 20 together with the wrapping ring 3 into the transport position. The wrapping ring 3 should also be locked and must not be rotated when the wrapping unit with the wrapping ring 3 is in the vertical or angled depositing or transport position. The following embodiment achieves this goal.

Figure 11:
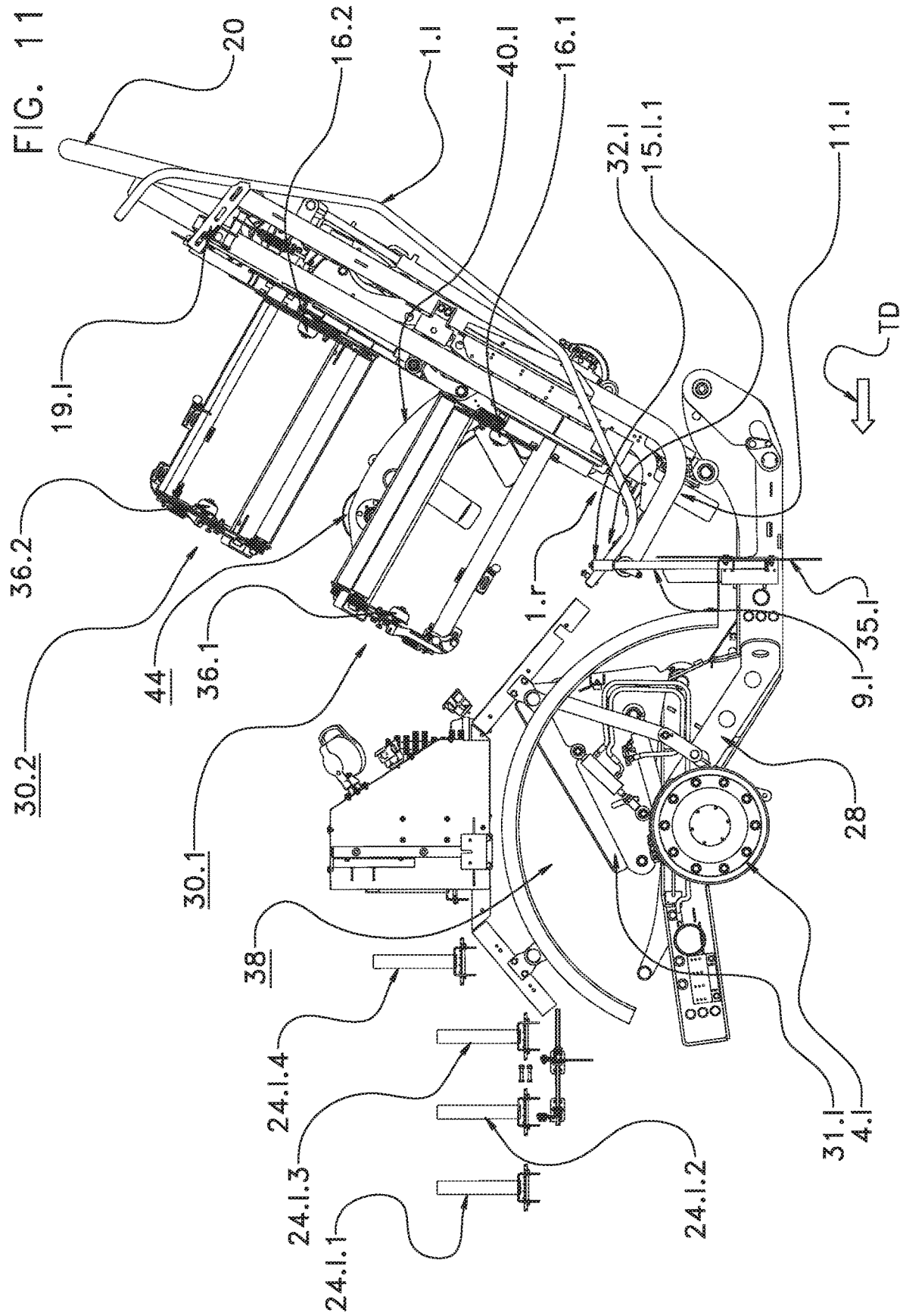
FIG. 11 shows from the left-hand side the wrapping unit in a tilted transport position and both barriers in the transport position.

As mentioned above a hydraulic actuator (not shown) can move the wrapping ring carrier 20 together with the wrapping ring 3 with respect to the combination frame 28 from the wrapping position into the depositing or transport position and back. FIG. 1 to FIG. 4 show the wrapping ring 3 in the wrapping position and FIG. 11 shows the wrapping ring 3 in the transport position. A mechanical barrier connector transfers this movement of the wrapping ring 3 onto both barriers 1.*l* and 1.*r* and forces the barrier 1.*l*, 1.*r* to be moved into the transport position. This mechanical barrier connector comprises a transport position rod 9.*l*, 9.*r* per barrier 1.*l*, 1.*r* which is vertically oriented and which is rigidly mounted at the combination frame 28 by means of a mounting bracket 14.*l*, 14.*r*, cf. FIG. 8, FIG. 9, and FIG. 15. The mounting bracket 14.*l*, 14.*r* is rigidly mounted at the mounting element 35.*l*, 35.*r* which in turn is mounted at the combination frame 28. The transport position rod 9.*l*, 9.*r* is hingedly connected with the assigned barrier 1.*l*, 1.*r* by means of a pivot 32.*l*, 32.*r*. This pivot 32.*l*, 32.*r* is positioned near the upper end of the transport position rod 9.*l*, 9.*r* such that the pivoting axis PA.l.1, PA.r.1 of the barrier 1.*l*, 1.*r* is positioned between the pivot 32.*l*, 32.*r* (connection with the rod 9.*l*, 9.*r*) and the pivot 12.*l*, 12.*r* (connection with the interrupting rod 5.*l*, 5.*r*), cf. FIG. 9. Two lever arms emerge.

When the wrapping ring 3 is pivoted upwards into the depositing or in the transport position, the mounting assemblies for the barriers 1.*l* and 1.*r* are also pivoted and all barrier pivoting axes PA.l.1, PA.r.1, PA.l.2, PA.r.2 are moved upwards. Thereby the respective lever arm emerging between the pivot 32.*l*, 32.*r* and the pivot axis PA.l.1, PA.l.2 forces both barriers 1.*l*, 1.*r* to be pivoted downwards with respect to the wrapping unit 3, 20, 30.1, 30.2 around the pivots 32.*l*, 32.*r* into the transport position. The moved barriers 1.*l*, 1.*r* pull the interrupting rods 5.*l*, 5.*r* upwards. Thereby both taps 7.*l* and 7.*r* are moved into the interrupting position and block the line 6.1, 6.2. The hydraulic flow is interrupted and wrapping ring motor 8 is deactivated. The wrapping ring 3 is no longer rotated and is clamped and locked by the jaws. No operator or control input is required.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

LIST OF REFERENCE SIGNS

1.*l* left wrapper barrier, hingedly mounted at the left holding element 18.*l* and rigidly mounted at the left rear horizontal connecting element 19.*l*, can pivot with respect to the wrapping ring carrier 20 around the axes PA.l.1, PA.l.2

1.*r* right wrapper barrier, hingedly mounted at the right holding element 18.*r* and rigidly mounted at the right rear horizontal connecting element 19.*r*, can pivot with respect to the wrapping ring carrier 20 around the axes PA.r.1, PA.r.2

2.1 frame of the first reservoir holder 30.1

2.2 frame of the second reservoir holder 30.2

3 wrapping ring, rotated with respect to the wrapping ring carrier 20 by the motor 8, carries and rotates both reservoir holders 30.1 and 30.2 around the bale to be wrapped on the wrapping table 44

4.*l* wheel rim of the left ground-engaging wheel

4.*r* wheel rim of the right ground-engaging wheel

5.*l* left interrupting rod, hingedly connected with the left wrapper barrier 1.*l* in the left pivot 12.*l* and with the left tap connecting element 10.*l*

5.*r* right interrupting rod, hingedly connected with the right wrapper barrier 1.*r* in the right pivot 12.*r* and with the right tap connecting element 10.*r*

6.1, 6.2 hydraulic lines of the hydraulic circuit for the hydraulic motor 8, can be interrupted by every one of the taps 7.*l* and 7.*r*

7.*l* left tap for disconnecting the hydraulic circuit for the hydraulic motor 8, is connected with the left interrupting rod 5.*l* by the left connecting element 10.*l*

7.*r* right tap for disconnecting the hydraulic circuit for the right hydraulic motor 8, is hingedly connected with the right interrupting rod **5.*r* by the right connecting element 10.*r***

8 hydraulic motor for rotating the wrapping ring 3 with respect to the wrapping ring carrier 20, supplied by the lines 6.1 and 6.2, serves as the wrapping unit drive 9.*l* left transport position rod for enforced pivoting the left wrapper barrier **1.*l* into the transport position, hingedly connected with the left wrapper barrier 1.*l* in the pivot 32.*l*, rigidly mounted at the left mounting element 35.*l***

9.*r* right transport position rod for enforced pivoting the right wrapper barrier **1.*r* into the transport position, hingedly connected with the right wrapper barrier 1.*r* in the pivot 32.*r*, rigidly mounted at the right mounting element 35.*r***

10.*l* left tap connecting element, hingedly connects the left tap activating element **17.*l* with the left interrupting rod 5.*l***

10.*r* right tap connecting element, hingedly connects the right tap activating element **17.*r* with the right interrupting rod 5.*r***

11.*l* left barrier carrier for carrying the left wrapper barrier **1.*l*, provides the hole sequence 13.*l*, carries the left holding element 18.*l***

11.*r* right barrier carrier for carrying the right wrapper barrier **1.*r*, provides the hole sequence 13.*r*, carries the right holding element 18.*r***

12.*l* left pivot between the left wrapper barrier **1.*l* and the left interrupting rod 5.*l*, mounted at the left pivot holder 22.*l***

12.*r* right pivot between the right wrapper barrier **1.*r* and the right interrupting rod 5.*r*, mounted at the right pivot holder 22.*r***

13.*l* sequence of holes or threads in the left carrier **11.*l***

13.*r* sequence of holes or threads in the right carrier **11.*r***

14.*l* mounting bracket at the bottom end of the left bracket **9.*l*, connected with the left mounting element 35.*l***

14.*r* mounting bracket at the bottom end of the right bracket **9.*r*, connected with the right mounting element 35.*r***

15.*l*.1, 15.*l*.2 left front and rear gas struts which tends to pivot and keep the left wrapper barrier **1.*l***

15.*r*.1, 15.*r*.2 right front and rear gas struts which tends to pivot and keep the right wrapper barrier **1.*r***

16.1 lower reservoir support of the first reservoir holder 30.1

16.2 lower reservoir support of the second reservoir holder 30.2

17.*l* left tap activating element, moves the left tap **7.*l* into the interrupting position, moved by the left tap connecting element 10.*l***

17.*r* right tap activating element, moves the right tap **7.*r* into the interrupting position, moved by the right tap connecting element 10.*r***

18.*l* left holding element for the left wrapper barrier **1.*l*, mounted at the left carrier 11.*l***, defines the left front pivoting axis PA.l.1

18.*r* right holding element for the right wrapper barrier **1.*l*, mounted at the right carrier 11.*r***

19.*l* left rear horizontal connecting element, rigidly connected with the left wrapper barrier **1.*l*, hingedly connected with the left stationary carrying element 23.*l* and with the left rear gas strut 15.*l*.2**

19.*r* right rear horizontal connecting element, rigidly connected with the right wrapper barrier **1.*r*, hingedly connected with the right stationary carrying element 23.*r* and with the right rear gas strut 15.*r*.2**

20 wrapping ring carrier, is pivotal with respect to the combination frame 28, carries the wrapping ring 3, the motor 8, the holding elements **18.*l*, 18.*r*, the clamping and cutting devices 46.1, 46.2, and the carrying elements 23.*l*, 23.*r***

21.*l* deflecting roller of the first reservoir holder 30.1

21.2 deflecting roller of the second reservoir holder 30.2

22.*l* left pivot holder for holding the left pivot **12.*l***

22.*r* right pivot holder for holding the right pivot **12.*r***

23.*l* stationary left carrying element mounted at the wrapping ring carrier 20, holds the left rear holding element **19.*l* for the left wrapper barrier 1.*l*, defines the left rear pivoting axis PA.l.2, hingedly connected with the left rear gas strut 15.*l*.2**

23.*r* stationary right carrying element mounted at the wrapping ring carrier 20, holds the right rear holding element **19.*r* for the right wrapper barrier 1.*r*, defines the right rear pivoting axis PA.r.2, hingedly connected with the right rear gas strut 15.*r*.2**

24.*l*.1, 24.*l*.2, . . . left pivotal holders for reserve film rolls

24.*r*.1, 24.*r*.2, . . . right pivotal holders for reserve film rolls 28 combination frame, carries the wrapping ring carrier 20 and the wrapping table 44

29 guiding roller for the wrapping ring 3

30.1 first reservoir holder, mounted on the wrapping ring 3, comprises the frame 2.1, the lower reservoir support 16.1, the upper reservoir support 36.1, and the deflecting roller 21.1

30.2 second reservoir holder, mounted on the wrapping ring 3, comprises the frame 2.2, the lower reservoir support 16.2, the upper reservoir support 36.2, and the deflecting roller 21.2

31.*l* left guiding sheet of the bale transfer unit 38

31.*r* right guiding sheet of the bale transfer unit 38

32.*l* left pivot between the left wrapper barrier **1.*l* and the left transport position rod 9.*l***

32.*r* right pivot between the right wrapper barrier **1.*r* and the right transport position rod 9.*r***

33 towing unit of the combination

34.*l* mounting element for the left tap **7.*l* and the left front gas strut 15.*l*.1**

35.*l* mounting element for the left transport position rod **9.*l*, rigidly mounted at the combination frame 28**

35.*r* mounting element for the right transport position rod **9.*r*, rigidly mounted at the combination frame 28**

36.1 upper reservoir support of the first reservoir holder 30.1

36.2 upper reservoir support of the second reservoir holder 30.2

38 bale transfer unit, moves a bale onto the wrapping table, comprises the guiding sheets **31.*l* and 31.*r***

40.*l*, 40.*r* left and right frame parts of the wrapper table frame 41.1, 41.2, 41.3 belts of the wrapping table 44

42.*f*, 42.*r* front and rear deflecting rollers of the wrapping table 44

43.*l*, 43.*r* left and right bobbins of the wrapping table 44

44 pivotal wrapping table, comprises the table frame with the parts **40.*l*, 40.*r*, the wrapping table belts 41.1, 41.2, 41.3, the deflecting rollers 42.*f*, 42.*r*, and the bobbins 43.*l*, 43.*r***

45.*l*, 45.*r* hydraulic actuators for pivoting the wrapping table 44

46.1, 46.2 clamping and cutting devices, mounted at the carrier 20

PA.l.1 front pivoting axis of the left wrapper barrier **1.*l*, defined by the left holding element 18.*l***

PA.l.2 rear pivoting axis of the left wrapper barrier **1.*l*, defined by the left carrying element 23.*l***

PA.r.1 front pivoting axis of the right wrapper barrier 1.r, defined by the right holding element 18.r PA.r.2 rear pivoting axis of the right wrapper barrier 1.r, defined by the right carrying element 23.r TD traveling direction of the baler-wrapper combination

The invention claimed is:

1. Wrapping apparatus for wrapping an object,
wherein the wrapping apparatus comprises
an object support for supporting from below an object to be wrapped,
a wrapping unit with at least one holder for a wrapping material reservoir,
a wrapping unit drive,
at least one barrier, and
a blocking mechanism,
wherein a wrapping unit part comprising the or at least one holder of the wrapping unit is rotatable with respect to the object support,
wherein the wrapping unit drive is arranged to rotate the rotatable wrapping unit part with respect to the object support,
thereby causing the object on the object support to be wrapped into at least one web of wrapping material taken from the or one wrapping material reservoir kept by the or one rotated holder,
wherein the or at least one barrier is movable with respect to the wrapping unit between
a protecting position and
at least one further position,
wherein the or one barrier being in the protecting position provides a mechanical safety mechanism, and
wherein the blocking mechanism is arranged to inhibit the wrapping unit drive to rotate the wrapping unit part if the or at least one moveable barrier is in the or one further position, wherein
the blocking mechanism comprises
at least one mechanical interrupter and
at least one interrupter connector,
wherein the or each interrupter is movable between
an interrupting position and
at least one further position,
wherein the or each interrupter being in the interrupting position interrupts a supply connection for the wrapping unit drive, thereby deactivating the wrapping unit drive,
wherein the or each interrupter connector mechanically connects the or each movable barrier with the or each interrupter
such that every movable barrier is connected with the or each interrupter, and
wherein the or each interrupter connector couples
a movement of the or each barrier into the or one further position with
a movement of the or each connected interrupter into the interrupting position
wherein the or each barrier has a smaller distance to the ground when being in the or one further position compared with being in the protecting position.

2. Wrapping apparatus according to claim 1,
wherein
the wrapping apparatus comprises two moveable barriers,
wherein every moveable barrier is movable independently from the or every other moveable barrier between
the protecting position and
the or at least one further position,
wherein every moveable barrier is connected with the or at least one interrupter connector, and
wherein every interrupter connector couples
a movement of the connected moveable barrier into the or one further position with
a movement of the or one connected interrupter into the interrupting position.

3. Wrapping apparatus according to claim 2,
wherein
the rotatable part of the wrapping unit is positioned between the or at least two barriers
at least if every barrier is in the protecting position.

4. Wrapping apparatus according to claim 1,
wherein
the or at least one movable barrier is pivotal with respect to the wrapping unit between
the protecting position and
the or every further position.

5. Wrapping apparatus according to claim 4,
wherein
the or at least one movable barrier is pivotal with respect to the wrapping unit about a barrier pivoting axis and
the or at least one interrupter connector connected with this pivotal barrier is pivotal with respect to the or one barrier about a connector pivoting axis,
wherein a distance between
the barrier pivoting axis and
the connector pivoting axis
occurs such that a lever arm for pivoting the interrupter connector emerges.

6. Wrapping apparatus according to claim 1,
wherein
the wrapping apparatus comprises
a frame and
at least one barrier connector connected with the or one moveable barrier,
wherein the wrapping unit is movable with respect to the frame between
at least one wrapping position and
at least one non-wrapping position,
wherein the wrapping apparatus is arranged to wrap the object on the object support when the wrapping unit is in the or one wrapping position, and
wherein the or every barrier connector couples
a movement of the wrapping unit with respect to the frame into the or one non-wrapping position with
a movement of the or one connected barrier into the or one further position.

7. Wrapping apparatus according to claim 6,
wherein
the or at least one barrier connector is connected with the frame,
wherein a movement of the wrapping unit into the or one non-wrapping position forces the or one barrier connected with the barrier connector to be moved into the or one further position, thereby causing the wrapping unit drive to be deactivated.

8. Wrapping apparatus according to claim 1,
wherein
the wrapping apparatus comprises at least one biasing element which tends to keep the or one moveable barrier in the protecting position.

9. Wrapping apparatus according to claim 8,
wherein
the or at least one biasing element further tends to keep the barrier being in the or one further position in this further position.

10. Wrapping apparatus according to claim 1,
wherein
the blocking mechanism comprises two interrupters,
wherein every interrupter is movable between
the interrupting position and
the at least one further position
independently from the or every other interrupter,
wherein every interrupter is connected with the or one interrupter connector, and
wherein the two interrupters are arranged to interrupt the supply connection at different locations when being in the interrupting position.

11. Wrapping apparatus according to claim 10,
wherein
the blocking mechanism comprises two interrupter connectors,
wherein every interrupter connector
is connected with at least one of the interrupters and
is movable independently from the or every other interrupter connector.

* * * * *